(12) United States Patent
Davis et al.

(10) Patent No.: US 10,885,336 B1
(45) Date of Patent: Jan. 5, 2021

(54) OBJECT IDENTIFICATION AND DEVICE COMMUNICATION THROUGH IMAGE AND AUDIO SIGNALS

(71) Applicant: Digimarc Corporation, Beaverton, OR (US)

(72) Inventors: Bruce L. Davis, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/246,423

(22) Filed: Jan. 11, 2019

Related U.S. Application Data

(60) Provisional application No. 62/617,222, filed on Jan. 13, 2018.

(51) Int. Cl.
| | | |
|---|---|---|
| *G06K 9/00* | (2006.01) | |
| *G06N 7/00* | (2006.01) | |
| *G06Q 30/06* | (2012.01) | |
| *H04W 4/029* | (2018.01) | |
| *G06T 11/00* | (2006.01) | |
| *G06T 11/60* | (2006.01) | |

(52) U.S. Cl.
CPC ......... *G06K 9/00671* (2013.01); *G06N 7/005* (2013.01); *G06Q 30/0623* (2013.01); *G06Q 30/0631* (2013.01); *H04W 4/029* (2018.02); *G06K 2209/27* (2013.01); *G06T 11/001* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,084,528 | A | 7/2000 | Beach |
| 6,098,106 | A | 8/2000 | Philyaw |
| 6,119,944 | A | 9/2000 | Mulla |

(Continued)

FOREIGN PATENT DOCUMENTS

| | | |
|---|---|---|
| WO | 0058883 | 10/2000 |
| WO | 2013033442 | 3/2013 |

OTHER PUBLICATIONS

"Bridging Printed Media and the Internet via Digimarc's Watermarking Technology," 8th ACM Int'l Multimedia Conf, Nov. 4, 2000. (5 pages).

(Continued)

*Primary Examiner* — Jwalant Amin
(74) *Attorney, Agent, or Firm* — Digimarc Corporation

(57) ABSTRACT

Deterministic identifiers fuel reliable efficient capture of product discovery, purchase and consumption events, which in turn enable more reliable product recommendation, more accurate shopping list generation and in-store navigation. A mobile device, equipped with image and audio detectors, extracts product identifiers from objects, display screens and ambient audio. In conjunction with a cloud-based service, a mobile device application obtains product information and logs product events for extracted identifiers. The cloud service generates recommendations, and mapping for in-store navigation. The detectors also provide reliable and efficient product identification for purchase events, and post shopping product consumption events.

15 Claims, 29 Drawing Sheets

(56) References Cited

U.S. PATENT DOCUMENTS

| | | |
|---|---|---|
| 6,122,403 A | 9/2000 | Rhoads |
| 6,125,172 A | 9/2000 | August |
| 6,300,880 B1 | 10/2001 | Sitnik |
| 6,389,055 B1 | 5/2002 | August |
| 6,448,979 B1 | 9/2002 | Schena |
| 6,491,217 B2 | 12/2002 | Catan |
| 6,505,160 B1 | 1/2003 | Levy |
| 6,512,919 B2 | 1/2003 | Ogasawara |
| 6,701,369 B1 | 3/2004 | Philyaw |
| 6,947,571 B1 | 9/2005 | Rhoads |
| 7,174,293 B2 | 2/2007 | Kenyon |
| 7,991,157 B2 | 8/2011 | Rhoads |
| 8,463,290 B2 | 6/2013 | Rhoads |
| 8,477,990 B2 | 7/2013 | Reed |
| 8,565,815 B2 | 10/2013 | Rhoads |
| 8,620,772 B2 | 12/2013 | Owen |
| 9,033,238 B2 | 5/2015 | Davis |
| 9,165,318 B1 | 10/2015 | Pauley |
| 9,224,184 B2 | 12/2015 | Bai |
| 9,262,681 B1 | 2/2016 | Mishra |
| 9,305,559 B2 | 4/2016 | Sharma |
| 9,311,640 B2 | 4/2016 | Filler |
| 9,367,770 B2 | 6/2016 | Footen |
| 9,451,406 B2 | 9/2016 | Cornaby |
| 9,454,789 B2 | 9/2016 | Lord |
| 9,595,059 B2 | 3/2017 | Knudson |
| 9,629,118 B2 | 4/2017 | Rhoads |
| 9,648,197 B2 | 5/2017 | Aller |
| 9,684,941 B2 | 6/2017 | Filler |
| 9,818,150 B2 | 11/2017 | Rhoads |
| 10,042,038 B1 | 8/2018 | Lord |
| 10,192,087 B2 | 1/2019 | Davis |
| 10,262,356 B2 * | 4/2019 | Davis ................ G06Q 30/0639 |
| 10,318,917 B1 | 6/2019 | Goldstein |
| 2001/0021916 A1 | 9/2001 | Takai |
| 2002/0032864 A1 | 3/2002 | Rhoads |
| 2002/0139848 A1 | 10/2002 | Catan |
| 2006/0047704 A1 | 3/2006 | Gopalakrishnan |
| 2008/0276286 A1 | 11/2008 | Robinson |
| 2009/0319388 A1 | 12/2009 | Yuan |
| 2010/0106662 A1 * | 4/2010 | Ramaswamy ......... G01C 21/20 |
| | | 705/323 |
| 2010/0154007 A1 | 6/2010 | Touboul |
| 2010/0158310 A1 | 6/2010 | McQueen |
| 2010/0174599 A1 | 7/2010 | Rosenblatt |
| 2010/0287057 A1 | 11/2010 | Aihara |
| 2010/0318440 A1 | 12/2010 | Coveley |
| 2011/0029370 A1 | 2/2011 | Roeding |
| 2011/0161076 A1 | 6/2011 | Davis |
| 2011/0178862 A1 | 7/2011 | Daigle |
| 2011/0212717 A1 | 9/2011 | Rhoads |
| 2012/0046071 A1 | 2/2012 | Brandis |
| 2012/0095853 A1 | 4/2012 | Von Bose |
| 2012/0208592 A1 | 8/2012 | Davis |
| 2012/0214515 A1 | 8/2012 | Davis |
| 2014/0052555 A1 | 2/2014 | Macintosh |
| 2014/0152507 A1 | 6/2014 | McAllister |
| 2014/0244514 A1 | 8/2014 | Rodriguez |
| 2014/0279294 A1 | 9/2014 | Field-Darragh et al. |
| 2014/0350710 A1 | 11/2014 | Gopalakrishnan |
| 2015/0006319 A1 | 1/2015 | Thomas |
| 2015/0012396 A1 | 1/2015 | Puerini |
| 2015/0012426 A1 | 1/2015 | Purves |
| 2015/0168538 A1 | 6/2015 | Bradley |
| 2015/0262120 A1 * | 9/2015 | Kulig .................... G06F 16/282 |
| | | 705/28 |
| 2015/0278980 A1 | 10/2015 | Sinclair |
| 2015/0310601 A1 | 10/2015 | Rodriguez |
| 2016/0027080 A1 | 1/2016 | Todasco |
| 2016/0063611 A1 | 3/2016 | Davis |
| 2016/0063821 A1 | 3/2016 | Macintosh |
| 2016/0189277 A1 | 6/2016 | Davis |
| 2016/0189286 A1 * | 6/2016 | Zohar ................ G06K 9/00355 |
| | | 348/150 |
| 2016/0371766 A1 * | 12/2016 | Schmidt ............. G06Q 30/0639 |
| 2016/0378427 A1 | 12/2016 | Sharma |
| 2017/0024840 A1 | 1/2017 | Holub |
| 2017/0249491 A1 | 8/2017 | Macintosh |
| 2017/0323376 A1 | 11/2017 | Glaser |
| 2019/0057435 A1 | 2/2019 | Chomley |
| 2019/0066142 A1 | 2/2019 | Soon-Shiong |

OTHER PUBLICATIONS

Alattar, "'Smart Images' Using Digimarc's Watermarking Technology," SPIE 12th Int'l Symposium on Electronic Imaging, Vo. 3971, No. 25, pp. 1-10, Jan. 2000.

Babenko, et al, Neural codes for image retrieval, arXiv preprint arXiv:1404.1777 (2014) (16 pages).

Krizhevsky, et al, Imagenet classification with deep convolutional neural networks, Advances in Neural Information Processing Systems 2012, pp. 1097-1105.

Simonyan, et al, Very deep convolutional networks for large-scale image recognition, arXiv preprint arXiv:1409.1556. Sep. 4, 2014.

Yeo et al, RadarCat: Radar Categorization for Input & Interaction, Proc. of the 29th Annual ACM Symposium on User Interface Software and Technology, pp. 833-841, 2016.

\* cited by examiner

LOG OF ITEM REMOVALS

| TIME | LOCATION | SHELF | ITEM GTIN | ITEM TEXT | ITEM WEIGHT | ... |
|---|---|---|---|---|---|---|
| 15:18:03 | 2E:17.5 | 2 | 016000275287 | CHEERIOS | 18 oz. | ... |
| 15:18:05 | 4W:05 | 4 | 10074182260122 | COLGATE SOFTSOAP | 7.5 oz. | ... |
| 15:18:12 | 2W:12 | 3 | 051000000118 | CAMPBELL'S TOMATO SOUP | 11 oz. | ... |
| 15:18:27 | 3E:27.5 | 2 | 000548004200629 | UNCLE BEN'S QUICK RICE | 18 oz. | ... |
| 15:19:12 | 1E:18.5 | 5 | 000561000049968 | TIDE DETERGENT | 50 oz. | ... |
| 15:19:13 | 4E:7.5 | 3 | 000399780033819 | BOB'S RED MILL FLOUR | 40 oz. | ... |
| 15:19:44 | 5N:8.5 | 3 | 000366320035653 | DANNON ACTIVA YOGURT | 32 oz. | ... |
| ... | | | | | | |

FIG. 9

LOG OF SHOPPER LOCATIONS

| TIME | S14.46A | S14.47A | S14.48B | S14.51A | S14.52A | S14.54A |
|---|---|---|---|---|---|---|
| 15:18:00 | 2E:17.5 | 4W:05.5 | 2:23 | 3E:5 | 2W:3 | 1W:17 |
| 15:18:02 | 2E:17.5 | 4W:05.5 | 2:21 | 3E:5 | 2W:6 | 1W:14 |
| 15:18:04 | 2E:17.5 | 4W:05.5 | 2W:19.5 | 3E:5 | 2W:9 | 1:10 |
| 15:18:06 | 2E:19 | 4W:05.5 | 2W:17.5 | 3E:5 | 2W:11 | 1:7 |
| 15:18:08 | 2:22 | 4W:05.5 | 2W:14 | 3E:8 | 2W:14 | 1E:3 |
| 15:18:10 | 2:25 | 4W:05.5 | 2W:12 | 3E:11 | 2W:14 | 6N:4 |
| 15:18:12 | 2E:26 | 4W:05.5 | 2W:12 | 3E:14 | 2W:16 | 6N:6 |
| ... | | | | | | |

FIG. 10

| SHOPPER 1 | SHOPPER 2 | SHOPPER 3 | SHOPPER 4 |
|---|---|---|---|
| TOOTHPASTE = 1.0 | COKE + TIDE = 2.0 | SUGAR = 1.57 | MUSTARD + SOUP + BREAD + CHEERIOS + SPECIAL-K = 4.37 |
| | | SUGAR + SOUP = 1.43 | MUSTARD + BREAD + CHEERIOS + SPECIAL-K = 4.23 |
| | | | MUSTARD + SOUP + BREAD + CHEERIOS + SPECIAL-K = 3.57 |
| | | | MUSTARD + SOUP + BREAD + CHEERIOS + SPECIAL-K = 2.57 |
| | | | MUSTARD + BREAD + CHEERIOS + SPECIAL-K = 3.43 |
| | | | MUSTARD + BREAD + CHEERIOS + SPECIAL-K = 3.43 |
| | | | MUSTARD + SOUP BREAD + CHEERIOS + SPECIAL-K = 2.77 |
| | | | MUSTARD + BREAD + CHEERIOS + SPECIAL-K = 2.63 |

FIG. 12

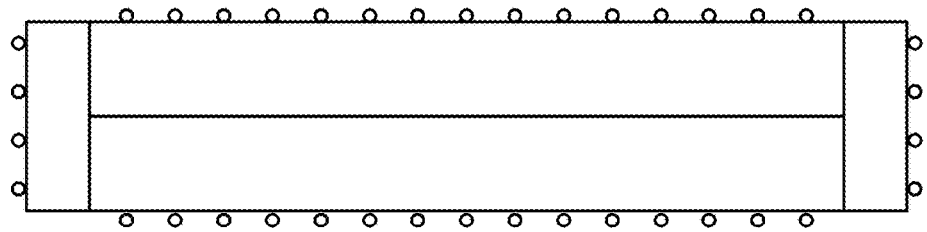
"3"
SUGAR
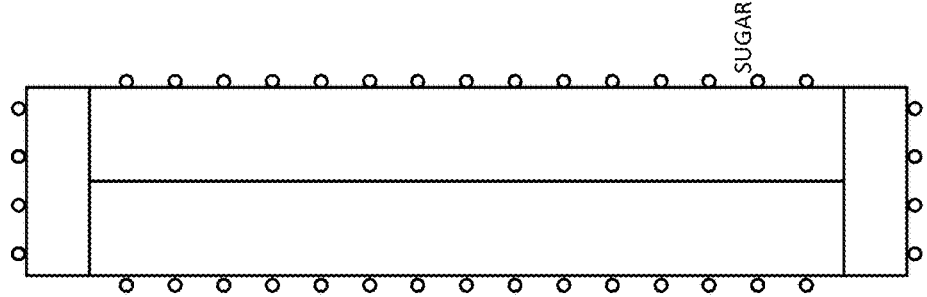
"2"
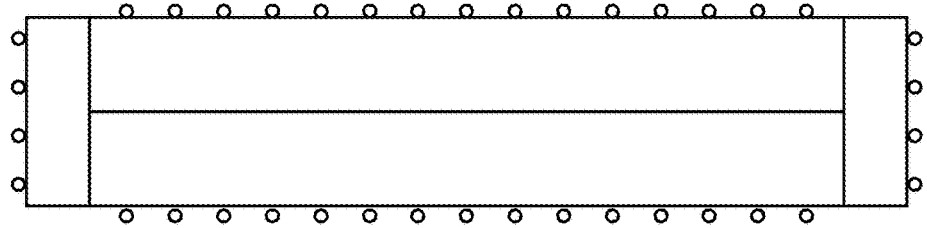
OATMEAL
FRUIT LOOPS
CHEERIOS
"1"
FIG. 16

OBJECT IDENTIFICATION AND DEVICE COMMUNICATION THROUGH IMAGE AND AUDIO SIGNALS

RELATED APPLICATION DATA

This application claims benefit of Provisional Application No. 62/617,222, filed Jan. 13, 2018. This application is related to Provisional Application 62/445,667, filed Jan. 12, 2017, and non-provisional Ser. No. 15/851,298, filed Dec. 21, 2017, the disclosures of which are incorporated by reference.

TECHNICAL FIELD

This application concerns technology for automated object identification and device communication through image and audio signals to identify products and discern movement and location throughout a product life-cycle.

INTRODUCTION

The present technology concerns image and audio signal processing to identify products in product discovery, purchase and consumption events. Camera based systems have been developed to monitor human actions and discern purchase intent probabilistically. Drawbacks of these systems are the inaccuracy and inefficiency of the methods for identifying which products are selected from shelves and which items are placed in the basket. Of utmost importance is to get the tally of intended purchases right. Further, accurate discernment of shopper intent, through product discovery and purchase selection, is critical to guiding the user through an efficient shopping experience. Inaccuracy in identifying shopper interest and purchase intent undermines the efficiency sought to be gained from automation because it adds additional time and expense in correcting errors. This inaccuracy also limits the ability of the system to facilitate in-store discovery of items relevant to the shopper, and relatedly, prevents accurate identification of product interest that is critical to provide effective recommendations.

BRIEF DESCRIPTION OF THE DRAWINGS

FIGS. 5A and 5B show shelving racks equipped with cameras, according to certain embodiments of the present technology.

FIG. 9 is a table showing a time-based log of detected item removals.

FIG. 10 is a table showing a time-based log of shopper positions.

FIG. 12 shows candidate item-shopper assignments, and an aggregate probability score for each.

FIG. 16 is an excerpt from FIG. 3, showing the locations of four particular items.

DETAILED DESCRIPTION

This technology improves on earlier work detailed in publications 20160063821, 20160189277, 20150012396 and 9,262,681. To comply with the statutory requirement of a concise specification, the disclosures of such documents are not repeated here; familiarity with these documents is presumed. (Such documents are expressly incorporated herein by reference, as if literally set forth in their entireties.)

In the description that follows, several variants are detailed for different aspects of illustrative systems. It should be recognized that one or more variants of one aspect can be used in conjunction with one or more variants of a second aspect, etc. For conciseness sake, each such combination is not separately recited, yet each is within the scope of the present disclosure.

Figure 1:
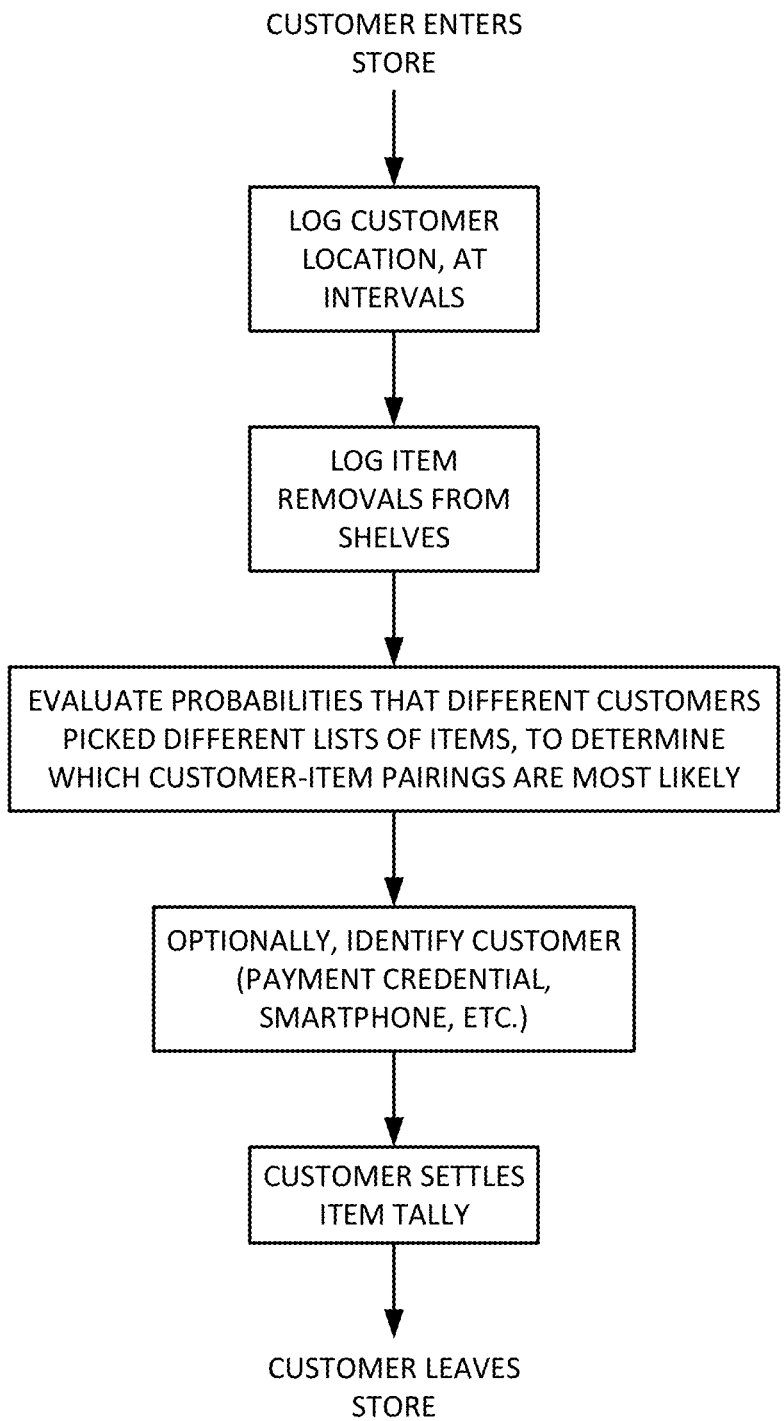
FIG. 1 is a flow chart illustrating certain aspects of one particular embodiment of the present technology.

For expository convenience, the specification assumes a shopper enters a bricks and mortar store, picks various item from shelves in aisles of the store, and leaves. The shopper may stop at a customer service station at the front of the store on the way out of the store, e.g., to tender cash payment (a.k.a. cash settlement) for the picked items. In different embodiments, the shopper may—or may not—have a smartphone. If present, the smartphone may be running software (e.g., an app associated with the retailer) that facilitates certain aspects of system operation. FIG. 1 shows an illustrative sequence of acts that may be employed in one implementation.

To Aid in Organization, this Specification is Divided in Terms of Various Functional Aspects, e.g.:

1. Identification of the shopper
2. Locating the shopper
3. Picking items from shelves
4. Associating items with the shopper; and
5. Checkout.

The specification includes several exemplary embodiments, including a section illustrating embodiments after these 5 sections. These embodiments additionally include automated object identification for pre-shopping product list and promotion generation and mapping, and for post-shopping product use instructions, recycling, and re-order.

Identification of the Shopper

Applicant prefers that the shopper's identity not be known to the store, unless and until the shopper so-elects.

Rather than identify the shopper upon entry of the store, certain embodiments of the present technology do not identify the shopper until a tally of items is finally charged to the shopper's credit card or other payment account—typically at the end of the shopper's visit, in a cashier-less transaction. In some instances, the shopper is never identified, e.g., if payment is made by cash.

While shopping, the shopper is typically an anonymous entity, without personally-identifiable data, whose movement through the store is sensed and associated with removal of different items from different shelf locations at different times. Different item tallies are thus compiled for different entities.

When one of these anonymous shoppers is sensed at the front of the store, ready to exit, a transaction typically takes place, settling the corresponding item tally—either by tender of cash payment, or presentation of other payment credential. (Such payment credential can be identity-revealing, such as credit card or loyalty account information, or it may be privacy preserving, such as cash or a bitcoin transaction.)

Upon the shopper's entry to the store, an identifier—desirably anonymous (in that it cannot be correlated to the shopper's name, credit card number, or other identity-revealing information)—may be associated with the shopper. One such identifier is a time-stamp, indicating, e.g., the UNIX time the shopper first entered the store, or was first detected as an anonymous entity. Such an identifier may be generated by the store, and optionally communicated to the shopper's smartphone (if present). Alternatively, the identifier may be generated by an app on the shopper's smartphone, and communicated to the store. This identifier is the logical construct—a session ID if you will—with which items picked from shelves are associated with the anonymous shopper. A pseudo-random number may similarly be used, instead of a time-stamp.

This time stamp may be communicated to the shopper's mobile device via the audio signaling technology of US Publication 20150168538, which is incorporated by reference.

Another identifier is a multiple-use arbitrary number. Exemplary is a random number generated by a smartphone shopping app when it is first installed on a phone, which thereafter serves to anonymously identify the phone and shopper, and is communicated by the phone to the store upon entry. Relatedly, a data structure like a browser cookie can be employed on a user's mobile device to provide a persistent yet anonymous identifier. A great variety of other identifiers that don't enable access to personally-identifiable information, yet are consistent through multiple visits to a store, can also be employed.

If an identifier associated with the shopper is known to both the store and the shopper's smartphone, such shared information can enable a session-based construct by which messages may be provided from the store to the user. The shopper may opt-in or opt-out to delivery of such messages.

During shopping, items may be bagged by the shopper in-aisle, e.g., transferred from the shelf directly into an over-the-shoulder purse or tote bag. However, many shopping trips involve more, or larger, items than can be conveniently placed in such a tote. Baskets and wheeled carts are thus desirably available. A bagging station at the front of the store, where items are transferred from a basket/cart into one or more bags, is thus commonly provided, and serves as a convenient location at which to finalize the shopping transaction, e.g., by the referenced payment transaction. Such a station also provides a physical site for in-person customer service, where a shopper can have a question answered, or obtain help in carrying items from the store. Thus, a bagging station is one location at which the shopper might finally be identified.

Another location at which the shopper might be personally identified is in an aisle of the store, e.g., by presenting a payment credential (e.g., credit card, or account-identifying information displayed on the screen of a smartphone) to a reader terminal found in a store aisle, or online—from a shopper smartphone to a networked computer associated with the store. Items associated with that shopping entity earlier in the shopper's visit to the store, and items thereafter associated with that entity during the remainder of the shopper's visit to the store, can thus be associated with the corresponding payment credential, with payment actually occurring when the shopper is sensed as leaving the store. In a smartphone embodiment, a smartphone application provides a "finished shopping" command, e.g., by voice or touch screen input, enabling the shopper to signal that she is ready for checkout, regardless of physical location within the store.

Figure 2A:
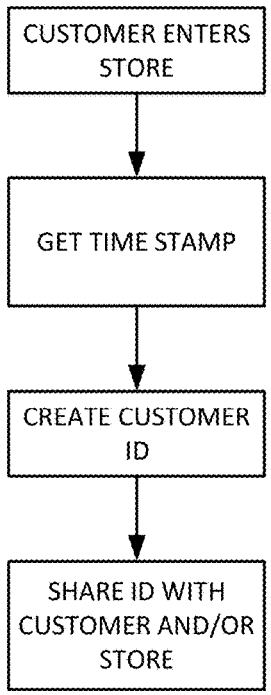
FIGS. 2A-2C are flow charts detailing certain aspects of illustrative embodiments of the present technology.
Figure 2B:
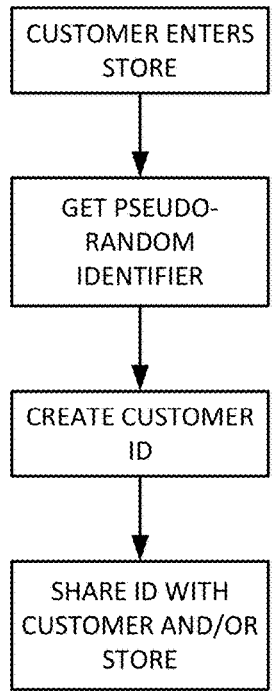
Figure 2C:
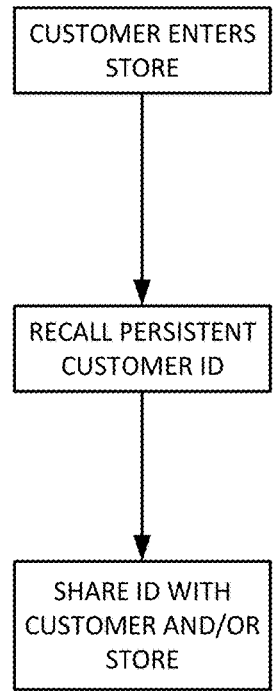

Certain of these arrangements are depicted by the flow charts of FIGS. 2A, 2B and 2C.

Locating the Shopper

A variety of technologies can be employed to determine the movements of a shopper through the store.

One is feature tracking, from imagery gathered by a network of video cameras positioned throughout the store, which do not capture personally-identifiable information. For example, thermal cameras, or depth-sensing cameras, typically capture data at resolutions coarse enough that facial recognition and other biometric identification is not practical. Additionally or alternatively, greyscale or color imaging cameras may be ceiling-mounted, and oriented substantially downwardly (e.g., vertically, or within 15 degrees of vertically), capturing a field of view narrow enough that they do not capture facial detail sufficient to perform shopper recognition.

From such camera data, an entity entering the store may be noted (e.g., as a pixel blob) and associated with an identifier—as discussed above. Thereafter, captured video from such cameras is analyzed to track subsequent movements, and pauses, of the blob throughout the store, until the blob finally returns to the front of the store to exit. (Suitable blob tracking technologies are identified below.)

Another location sensing arrangement makes use of a shopping cart/basket/tote employed by the shopper. (For expository convenience, the term "basket" is hereafter used to collectively refer to such conveyances.) Mounted on the basket is an electronic sensor that receives signals emitted from signal emitters throughout the store. These signals are processed to triangulate position of the cart/basket, e.g., based on time-of-arrival or related principles. WiFi, Bluetooth, and audio signal sources can be used. Reciprocally, the basket may convey such a signal emitter, and sensors disposed throughout the store can sense the signals, which are then processed to triangulate the position of the emitter. (Shelf mounted electronic price displays, sometimes termed "shelf-talkers," may be mounted every few feet along aisle shelving, and can be equipped with such wireless emitters or detectors.)

LED lighting can also be employed to determine a shopper's position. For example, LED devices distributed throughout the store can each be modulated with a distinctive multi-bit payload signal (e.g., by pulse-coded modulation). A photodiode or other sensor coupled to the user's basket senses the signal, which is decoded and resolved—via an associated data structure—to indicate the position of the LED device from which the modulated light was sensed. (Again, shelf-mounted electronic price displays may be equipped with such LED signaling capability.) Overhead lighting can also be employed in this manner.

Still another location sensing arrangement makes use of the shopper's smartphone, if present. The smartphone can serve either as a sensor or an emitter, in the just-reviewed arrangements. In this case, it can be desirable to equip the shopper's basket with a pocket or sleeve where the smartphone can rest during shopping, e.g., with its speaker, camera, and/or microphone relatively unimpeded.

A particularly-preferred location arrangement is detailed in applicant's patent publication 20150168538, in which speakers of an audio distribution system that are used to play background music at a store, all convey the same human-perceptible music, but are separately digitally-watermarked to steganographically convey different identifiers, in a time-synchronized manner. The steganographically-encoded identifiers detected by an audio sensing system (e.g., in a smartphone or basket), and their relative timings, reveal the position of the sensing system within the store—down to a granularity of one foot or less. Related technology is detailed in application 20120214515.

The sensing system (smartphone or basket) may also correlate identifiers detected from audio emitted by audio speakers or images of in-store items with known locations of those items (e.g., speaker location, shelf location, product location in a product planogram, etc.). With each scan, the localization routine uses the identifier obtained from analysis of the scanned image, captured audio, or both to look up the physical, in store location correlated with that identifier.

Figure 3:
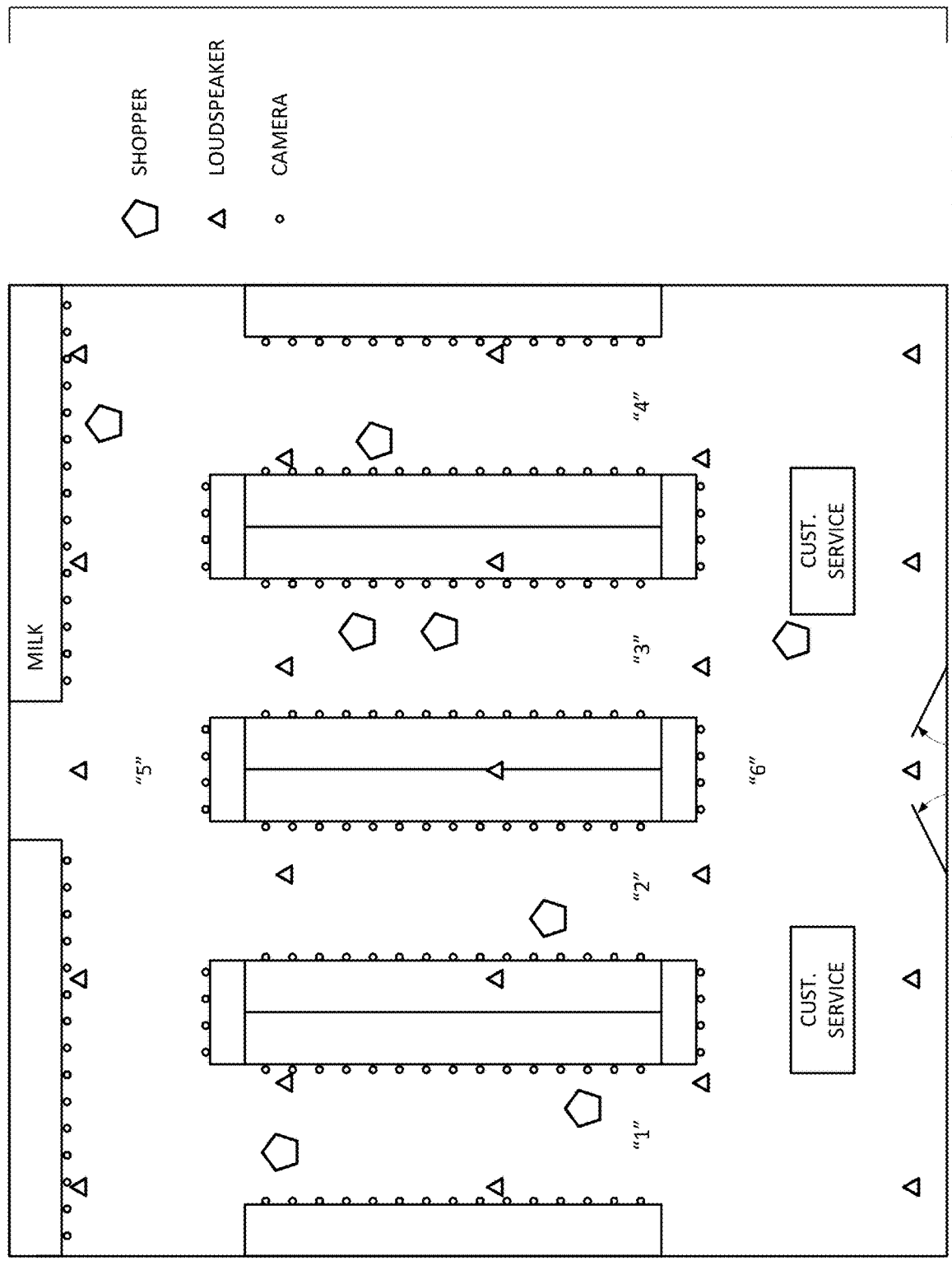
FIG. 3 is an overhead schematic view of a retail store, showing aisles, shelving, etc.

FIG. 3 illustrates the floor plan of publicly-accessible portions of a representative retail store. The front of the store is at the bottom, near entrance/exit doors. Depicted in this figure is an array of ceiling-mounted loudspeakers (indicated by the triangles) that each renders a differently-watermarked version of the same audio background music. (The diagram can also serve to identify an image-feature-tracking embodiment, if the triangle shapes denote cameras—although a denser placement of cameras would typically be used.)

Other indoor positioning technologies can alternatively be employed. The arrangements detailed in applicant's U.S. Pat. No. 8,463,290, and pending application Ser. No. 15/255, 114, filed Sep. 1, 2016 (Now U.S. Pat. No. 10,042,038), are exemplary.

In an illustrative embodiment, a database application running on a store computer logs position data for each different shopper entity in the store at periodic intervals, such as every second or two.

Figure 4A:
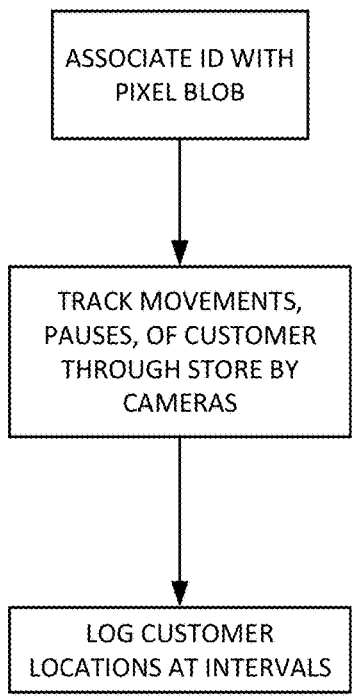
FIGS. 4A and 5B are flow charts detailing certain aspects of illustrative embodiments of the present technology.
Figure 4B:
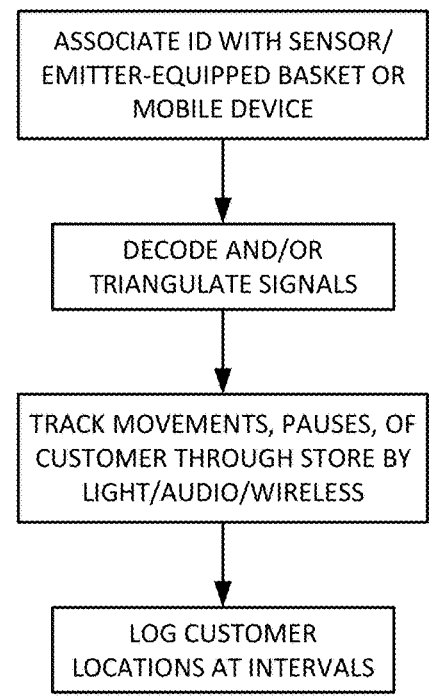

FIGS. 4A and 4B depict certain of the above-detailed arrangements.

Picking Items from Shelves

The presence of a shopper entity at a particular location within a store, temporally-coincident with the removal of an item from a shelf at that location, gives rise to a high confidence hypothesis that the item was removed by that shopper entity. (However, as detailed below, this is not the only way such hypotheses can be generated.)

Removal of an item from a shelf can be sensed by various means.

One such means is an array of downwardly-looking cameras, which may be provided at regularly-spaced intervals along the length of a shelf, or shelf rack. For example, the cameras may be spaced at 12, 24 or 36 inch intervals. The front of each shelf may have such a camera array—to capture data indicating withdrawal of items from the shelf beneath, or a single array of cameras may be positioned above a rack of shelves.

Figure 5B:
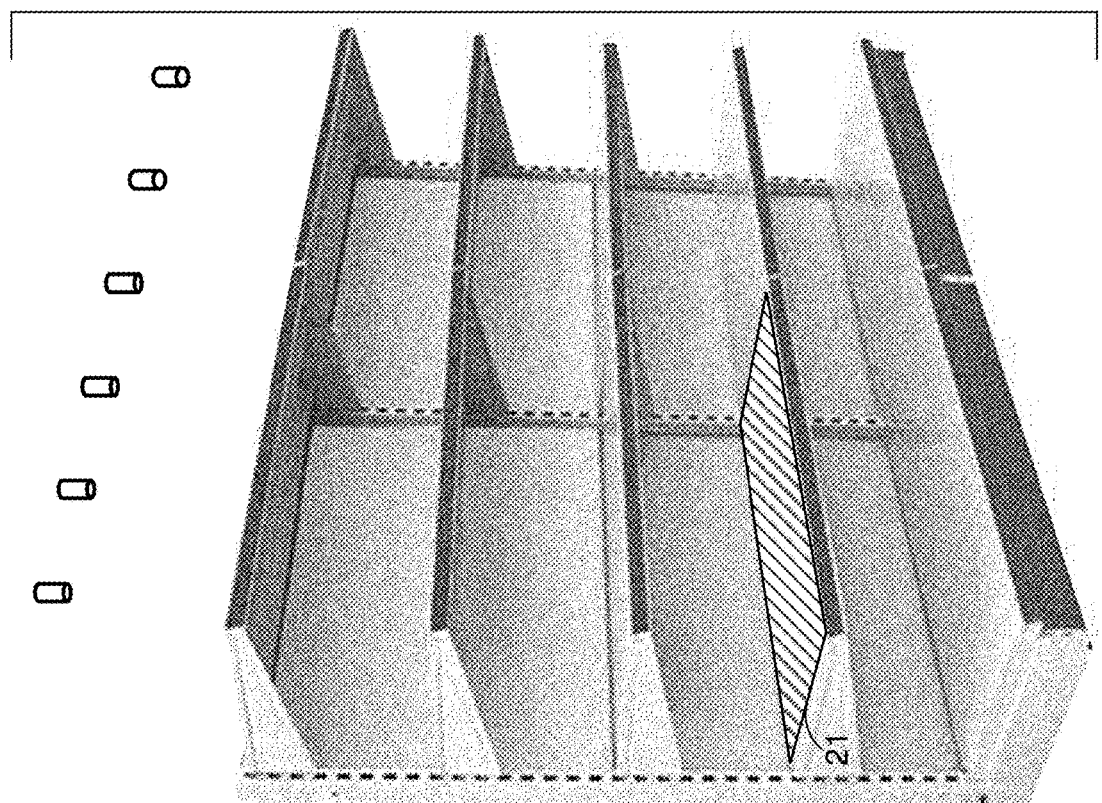
Figure 5A:
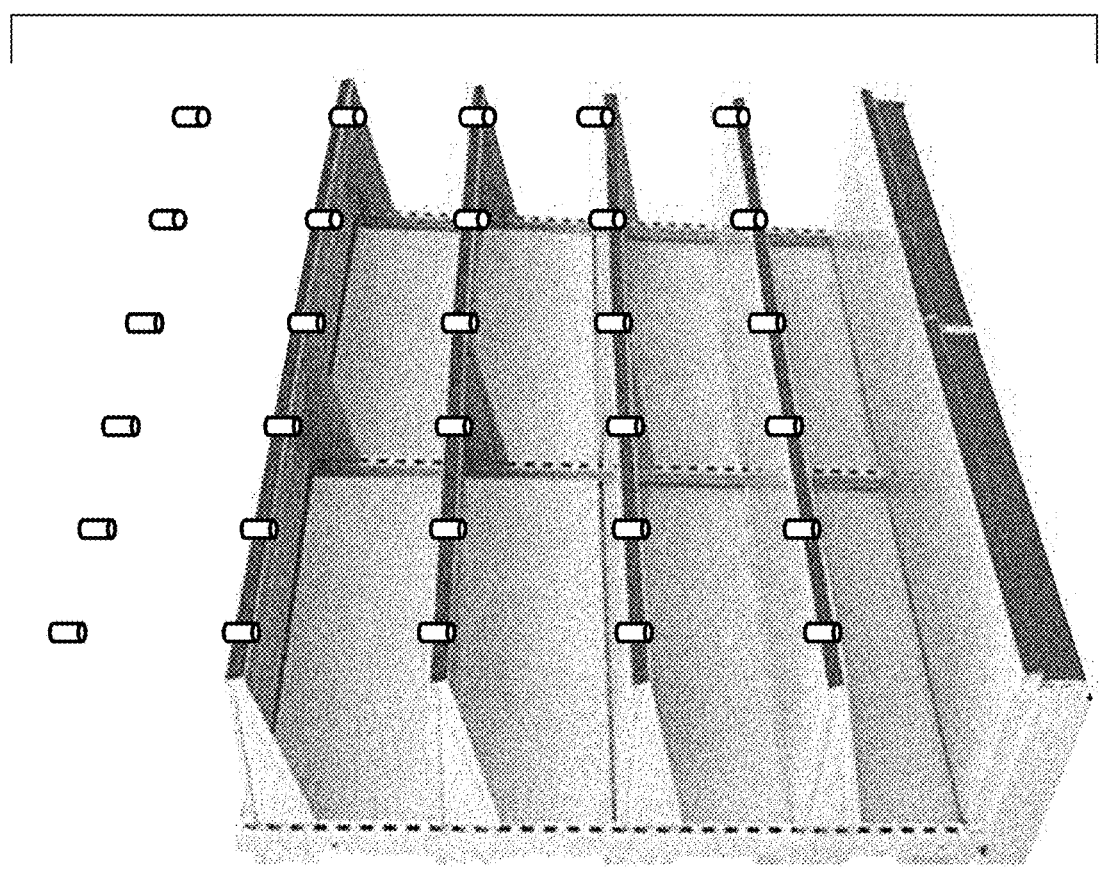

Such arrangements are shown, respectively, in FIGS. 5A and 5B.

Such an array of cameras along a shelf or rack essentially defines a vertical sensing curtain that is monitored for hands reaching toward a shelf, and stocked items being withdrawn.

Figure 6:
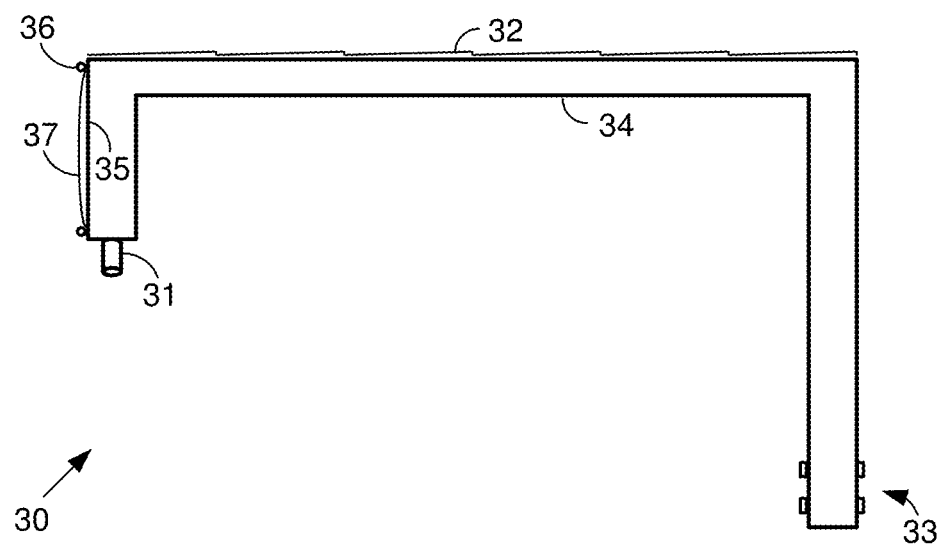
FIG. 6 is a side view of a camera array that can be affixed to a shelving rack.

To facilitate installation and maintenance of the camera arrays, they can be provided in assemblies that mount to the back frame of a shelving rack, and provide multiple cameras, together with an array of solar cells to generate power from store lighting. A side view of such an assembly 30 is shown in FIG. 6 and includes plural cameras 31, a solar panel array 32, a shelf mounting fixture 33 (e.g., bolts and nuts, to engage corresponding holes in the rack of shelving), and a framework 34 to which such elements are mounted. The front of the framework can include a panel 35 and clips 36 where plastic signage 37 can removably be mounted, e.g., to promote sales of an item stocked on the associated shelving.

Not shown in FIG. 6 is an Arduino computer board with associated memory, which forms part of the assembly, and is configured to detect any change (motion) within the captured imagery (e.g., when a hand passes into a camera's field of view). Upon such event, the Arduino computer executes a recognition routine (e.g., as detailed below), and buffers the results. Periodically, such as every minute or two, the processor board activates a wireless adapter (e.g., WiFi or Zigbee) and relays the data it has buffered to a central store computer that maintains item tallies for all shoppers, or to an intermediate controller.

Items withdrawn from shelves can be identified in various ways. One is by image analysis. If the cameras capture greyscale or color pixel data, known image recognition techniques can be used to recognize the item. For example, SIFT points or other distinctive features from the item (e.g., from a label on the item) can be extracted from the imagery by the shelf-mounted Arduino processor, relayed to the central store computer, and compared against a database of known SIFT points for reference items, to identify the item to which said features correspond. (Such distinctive feature-based approaches are sometimes termed image fingerprinting.)

The universe of reference item features with which the extracted features are compared can be constrained based on the items known to be shelved on that particular shelf (e.g., by reference to store planogram data). If an item is withdrawn from a shelf that is known to stock only peanut butter jars, the extracted features need be compared only against features found on peanut butter jars. Comparison against features from boxes of toothpaste, cans of olives, etc., need not be considered.

Product recognition can proceed by means other than image fingerprinting. For example, captured greyscale or color imagery can be examined for the presence of digital watermark data or barcode data conveying a machine readable item identifier (e.g., GTIN, or Global Trade Item Number). Still further, image-based item recognition may be performed by a convolutional neural network that has been trained to recognize items stocked in the store. (Differently-trained neural networks can be applied to analyze imagery captured from different shelves, in recognition of the different types of items stocked in different locations, as in the peanut butter jar example, above.) Convolutional neural networks are discussed further below.

In other embodiments, greyscale or color imagery need not be used. Thermal or depth sensing cameras can be used—simply to identify the region on the shelf/rack at which a shopper reached for an item, or from which an item was removed. Planogram data (e.g., in a store database) that specifies the known locations where different items are stocked, can serve to associate different shelf locations with different items.

If a single curtain of camera data is collected for a rack of shelves as in FIG. 5A, there is ambiguity as to which shelf—vertically—is being accessed by the shopper. A pressure sensitive mat can be provided on each shelf, and can serve to unambiguously identify the particular shelf from which an item was withdrawn. The camera data thus provides a spatial coordinate datum down the length of the aisle (i.e., laterally, or horizontally), and the mat provides a spatial datum vertically, allowing identification of the withdrawn item from the planogram data. (For clarity of illustration, FIG. 5A shows just a single pressure sensitive mat 21. It will be understood that each shelf in the vertical rack of shelves would have its own such mat.)

Instead of downwardly-directed cameras as in FIGS. 5A and 5B, another embodiment relies on cross-aisle cameras. Each shelf (or rack of shelves) conveys cameras with horizontally-oriented lens axes, which view shelves (or a rack of shelves) across the aisle. In such arrangement, the shopper's reaching into the shelf for an item may not be depicted—because the camera's view of the shopper's arm/hand is likely occluded by the shopper's body. However, camera data captured before and after the shopper moved into view is analyzed to determine what—if anything—is different on the depicted shelves. If a can of tomato soup was shown at a location on a shelf before the shopper arrived, and after the shopper moved-on the imagery no longer shows a can at that location, a high confidence inference can be made that the shopper removed the can. (Again, such cameras can be thermal or depth-sensing, rather than color or greyscale, to aid in preservation of shopper privacy.)

Still another embodiment employs cameras that are mounted on the front edge of shelves, and that look back towards the stocked items. Again, the captured imagery can be examined to note the removal of different items. (One such arrangement includes a rear-facing camera on the back of electronic price displays positioned at regular intervals along the front of a shelf, as detailed in applicant's U.S. Pat. No. 9,367,770.)

Yet another embodiment employs camera sensors provided within baskets—imaging items as they are placed in, and/or rest in, the basket, and identified using one of the above-referenced technologies.

Other, less familiar, item identification technologies can be employed. These include marking items with magnetic signatures (using corresponding magnetic sensors for detection), and machine learning-based item identification systems employing radar or capacitive sensing. (See, e.g., Yeo et al, RadarCat: Radar Categorization for Input & Interaction, Proc. of the 29th Annual ACM Symposium on User Interface Software and Technology, pp. 833-841, 2016, attached to application 62/445,667.) Such detectors can be deployed in shelves, in baskets, or at customer service counters, etc., as best fits the particular technology.

Although not presently common, Applicant expects retailers will soon insist on serialization of packages. That is, each item has a unique identity, which is encoded on the item (e.g., by steganographic watermark, barcode, RFID or otherwise). When the item is withdrawn from the shelf, the serial number is read, and checked against a punch list of items that should not be sold, e.g., due to expiration or recall. If such a condition is sensed, an alert may be sent (by text, email, or via a store app) to the shopper's smartphone (if present). Additionally or alternatively, store staff may be alerted. When the shopper entity that removed the item is sensed as approaching the front of the store, a customer service agent can alert the shopper about the expiration/recall, and retrieve the product.

As indicated, item-removal sensors other than camera-based systems can also be employed. One, as just-suggested, is RFID. Each item may convey an RFID tag, and RFID readers on the shelf racks can be alert to disappearance of tagged items from within range of the reader.

In still another arrangement, an item-removal sensor can comprise a pressure-sensitive mat, like that referenced earlier, but with an array of pressure sensors—indicating pressure at plural different locations along the length of the shelf. If an item is removed, the location from which it was removed is readily determined by the change in pressure at that location on the mat. Again, by reference to store planogram data, sensed shelf location can readily be correlated with identification information for the removed item.

Figure 7A:
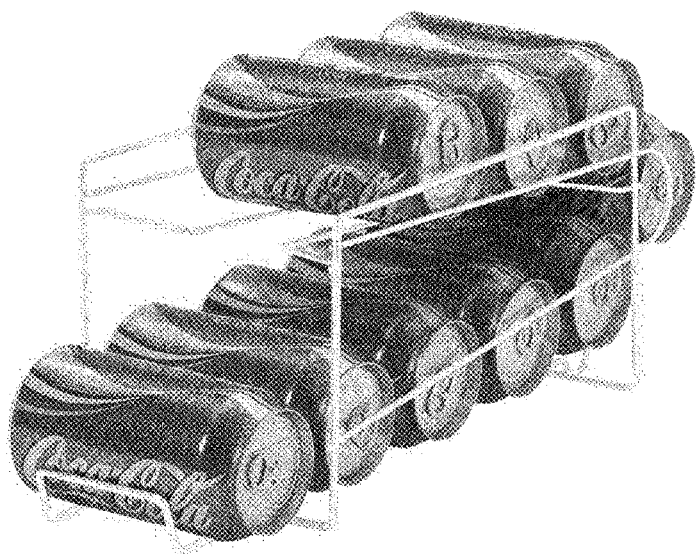
FIGS. 7A and 7B show two different prior art can dispensers.
Figure 7B:
Figures 8A, 8B, 8C:
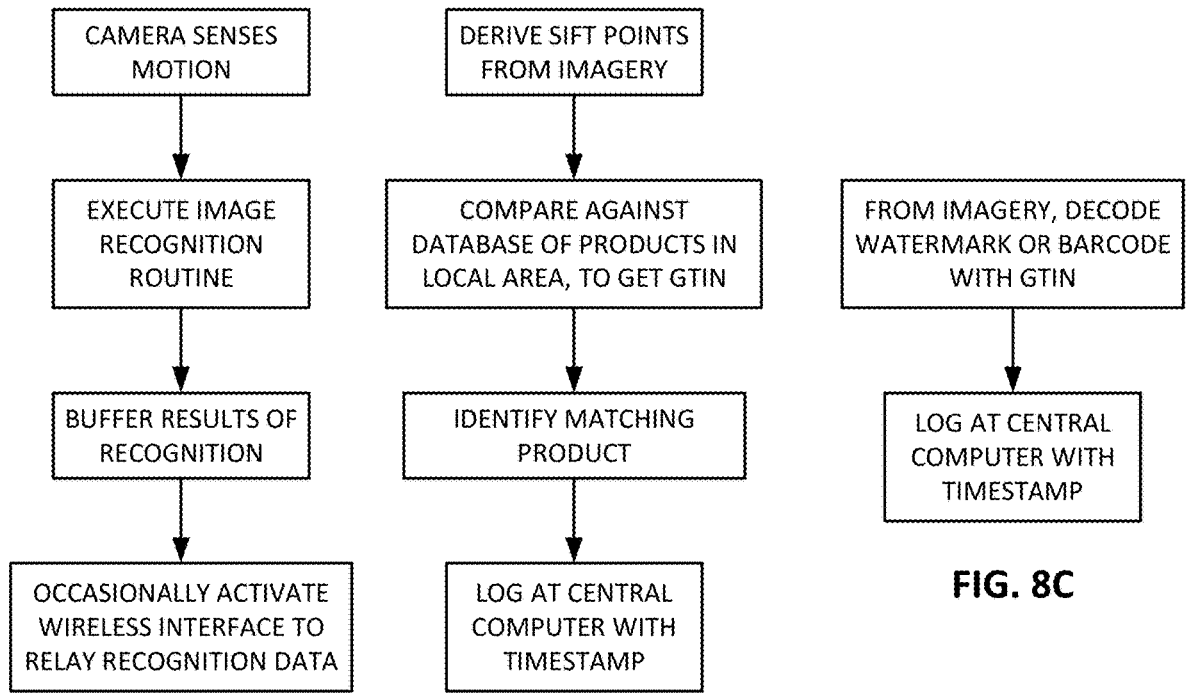
FIGS. 8A-8G are flow charts detailing certain aspects of illustrative embodiments of the present technology.
Figures 8D, 8E:
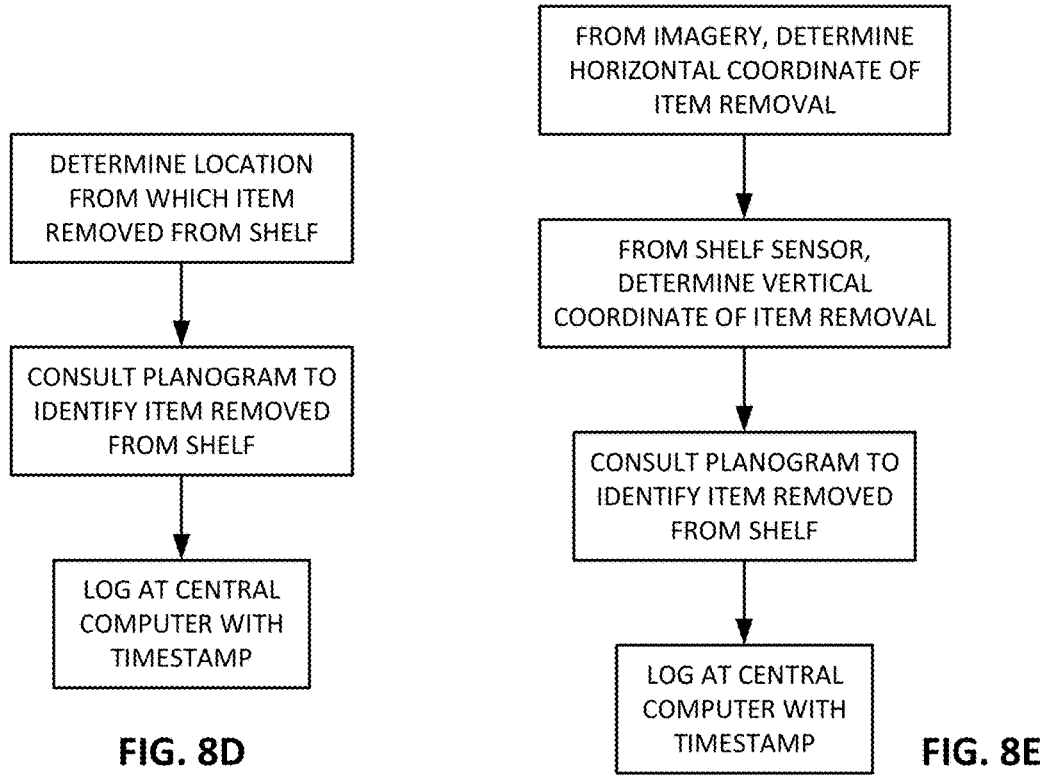
Figure 8F:
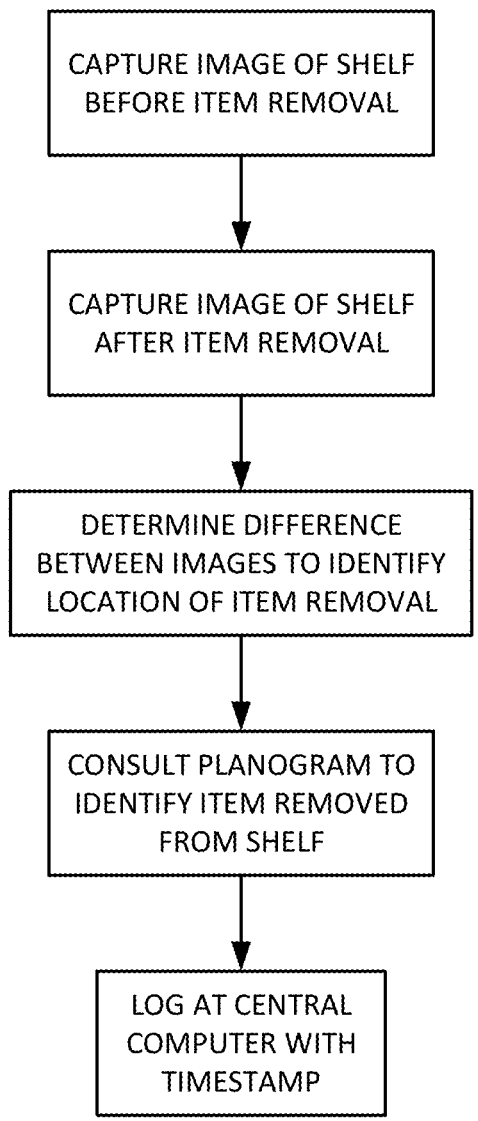
Figure 8G:
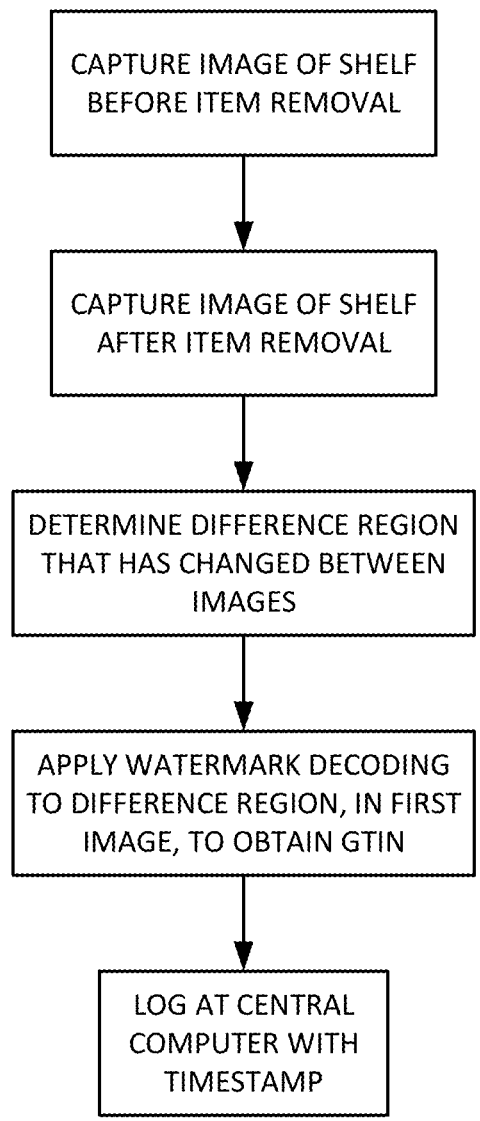

In yet another embodiment, certain items in a retail store are stocked in gravity-based dispenser apparatuses that can be operated to dispense one item at a time. Soup cans and soda cans are beginning to be stocked in such devices. These devices can be equipped with a microswitch that intermittently opens (or closes) when a can is dispensed. Each switch can issue a signal to an associated data collection system, indicating a shopper has removed a corresponding product. FIGS. 7A and 7B show examples of prior art dispensers, which can be equipped with such microswitches.

Even if such a dispenser is not equipped with a microswitch sensor, the use of such dispensers can be advantageous because the horizontal orientation of the cans allows label artwork to be visible to downwardly oriented cameras overhead—aiding recognition by the technologies identified earlier (e.g., watermark, image fingerprint, neural network).

In some arrangements, the item identification task is performed in distributed fashion. For example, each aisle of the store includes a controller to which sensors (e.g., cameras, microswitches and/or mats) are coupled. The controller includes a processor that analyzes the sensed data, and outputs a time-based list of item-removal events. This analysis can include, e.g., watermark and barcode decoding, image recognition, correlation of sensor data with store planogram data, etc. The resulting list is streamed to a central store computer, or buffered and provided periodically in batch fashion. The store computer then consolidates such lists from each aisle in the store into a common database, detailing information about each item removal in the store, together with its associated time-stamp.

All of the above-detailed sensing arrangements and data processing arrangements mounted on the shelving racks, can be powered from solar cells, as detailed in connection with FIG. 6, or may be battery powered.

In still other embodiments, item-removal sensing is not performed by fixed infrastructure sensors—such as cameras and/or mats, but rather by sensors conveyed by shoppers' baskets. For example, one or more cameras can capture imagery of a selected item as it is placed in a basket. As before, the item can be recognized by machine readable indicia, image fingerprinting, neural networks, etc. (Some such technology is detailed in Applicant's earlier-cited publications 20160063821 and 20160189277, and in Amazon's publication 20140350710.) Again, corresponding item identification data is sent to the central store computer, together with a time stamp for the item detection.

A simpler and more reliable system asks consumers to indicate product interest and purchase intent by scanning item with smartphone or retail imager (mobile reader, cart-mounted, or kiosk). Products so scanned are preferably identified by digital watermark technology, as it provides a deterministic identifier, improving the quality of input to a learning system for predicting product interest from scan behavior.

Certain of the foregoing arrangements are illustrated by FIGS. 8A-8G.

Associating Items with the Shopper

As indicated, temporal coincidence between detection of an item leaving a shelf (or being placed in a basket), and a shopper's location at that shelf location, gives rise to an inference that the item should be added to a checkout tally for that shopper.

There is no need to infer in image sensing embodiments where items are scanned as they are placed in the shopper's basket.

To detect such coincidences, the store computer may work from two lists. One is a log of detected item removals. The other is in-store geolocation track data for each shopper entity.

A sample log of detected item removals is shown in FIG. 9. The first item is a time-stamp (e.g., hour:minute:second). Next is an indication of the item location in the store, indicated by Row/Side number (e.g., Aisles 1-6 marked in FIG. 3, followed by E, W, N or S to indicate side). Appended after the colon is the location down the aisle, from the front of store, or west of store end, indicated in feet. Following that is the shelf number from which the item was removed (e.g., with "1" being the bottom shelf.) Next are the item GTIN, a textual description (for the register tape), and the item weight. Other metadata (e.g., item price) can also be included.

The in-store geolocation of each (anonymous) shopper can be noted every second or two in a different data structure. The location can be indicated in literal distance coordinates, e.g., measured in feet with the southwest-most corner of the public space being the origin of the coordinate system. Other location indicia can alternatively be used, e.g., aisle/side/feet-down-the-aisle, as in the second column of FIG. 9.

Alternatively, the shopper's mobile device, e.g., smartphone or wearable, indicates locations, direction, intent and decisions. The device provides location by audio, RF or other signal based localization. The device provides direction by tracking location over time or employing motion sensors in a dead reckoning approach relative to waypoints sensed by the device sensors in image, RF or audio signals in the environment. Decisions made by the shopper after product scan are recorded to capture shopper interest, including decisions whether to purchase or not, seek more information by scanning the watermark on the label, select a particular product after scanning the watermarks and comparing plural items in a product category, etc.

FIG. 10 shows an illustrative data structure tracking the location of various shoppers, at two second intervals, by aisle/side/feet indicia. (If the shopper is closer to the middle of an aisle, than to the shelving rack on either side, the "side" indicia is omitted.) This data may be termed "shopper track data."

Such approximation techniques are further improved by augmenting the approximation of a location with audio or image watermark reads obtained from a sensor on the basket or shopper's mobile device (smartphone or wearable device). The watermark reads provide identifiers, which correspond to audio or image sources that are associated with physical store locations in the cloud system.

The first column shows the time stamp. The location of all shoppers in the store is logged at the same two second intervals, in the depicted embodiment. The following columns show excerpts of the position tracks of six shoppers. Each shopper is anonymously identified by an S-prefixed datum at the top of the column (e.g., S14.46A), signifying the hour.minute they were first sensed in the store, followed by a letter indicating their order of first detection within that minute.

As can be seen from FIG. 9, the shopper identified as S14.46A was located at Aisle 2, East side, at position 17.5,' at time-stamps 15:18:00, 15:18:02 and 15:18:04. Coincidentally, at time 15:18:03, the item-removal log of FIG. 9 shows that a box of Cheerios was removed from a shelf located at Aisle 2, East side, position 17.5.' From this data, the system can infer that the box of Cheerios should be added to the checkout tally for shopper S14.46A.

In similar fashion, the item-removal log of FIG. 9, and the shopper track data of FIG. 10, indicate that a Colgate Softsoap item should be added to the checkout tally for shopper S14.47A. And likewise, these data indicate that a can of Campbell's tomato soup should be added to the checkout tally for shopper S14.48B.

Although the procedure just-reviewed can suffice to compile tallies for each of the shoppers in the store, circumstances often arise that require more nuanced inferences. For example, two people may be paused near a shelf location from which a single item is removed. Or due to intervening traffic in an aisle, a cross-aisle inspection camera may not note an item's removal until several seconds after the event. Likewise with a delay between a shopper picking up an item, and depositing it in a camera-equipped basket. Depending on the sampling interval of shopper location, there may be no time stamp in the shopper-location log of FIG. 10 that corresponds to an item-removal time stamp in FIG. 9. Etc. By reason of these and other circumstances, Applicant has found it advantageous to employ more sophisticated tallying systems, e.g., probabilistically considering plural different item-shopper assignment possibilities.

This probabilistic estimation is obviated in embodiments where the basket camera is further equipped with digital watermark reading capability and products are encoded with identifiers in watermark signals in product packaging or labels.

Certain aspects of one such tallying system are shown in FIGS. 11A-11D. These figures depict lattice diagrams. Each row corresponds to an item that has been sensed as removed from a shelf in the store: Cheerios cereal, Special-K cereal, Tide detergent, etc. Each column corresponds to a point in time: T1, T2, T3, etc. (These time points need not be uniformly spaced. In the illustrated embodiment, the time points used in the left column of FIG. 9 are used, i.e., the time points at which item removals were detected.) Each diagram corresponds to a different shopper (as indicated by the numbered pentagon at the left side of the diagram).

One or more paths is traced through the lattice, indicating a sequence of candidate item removals by that shopper. If, at a time point at which an item was removed from a shelf location, the shopper was nowhere near that shelf location, the column for that time point is bypassed, by routing the lattice track through the square node at the top of that column. If the shopper's position corresponds, both spatially and temporally, to a noted withdrawal of an item from a shelf location, then the lattice track passes through a node that is defined by that item and that time point. Thus, FIG. 11A indicates that shopper 1 was tracked to the location where a box of toothpaste was withdrawn from a shelf, and was present at that shelf location at the time point that such withdrawal was sensed.

Figure 11A:
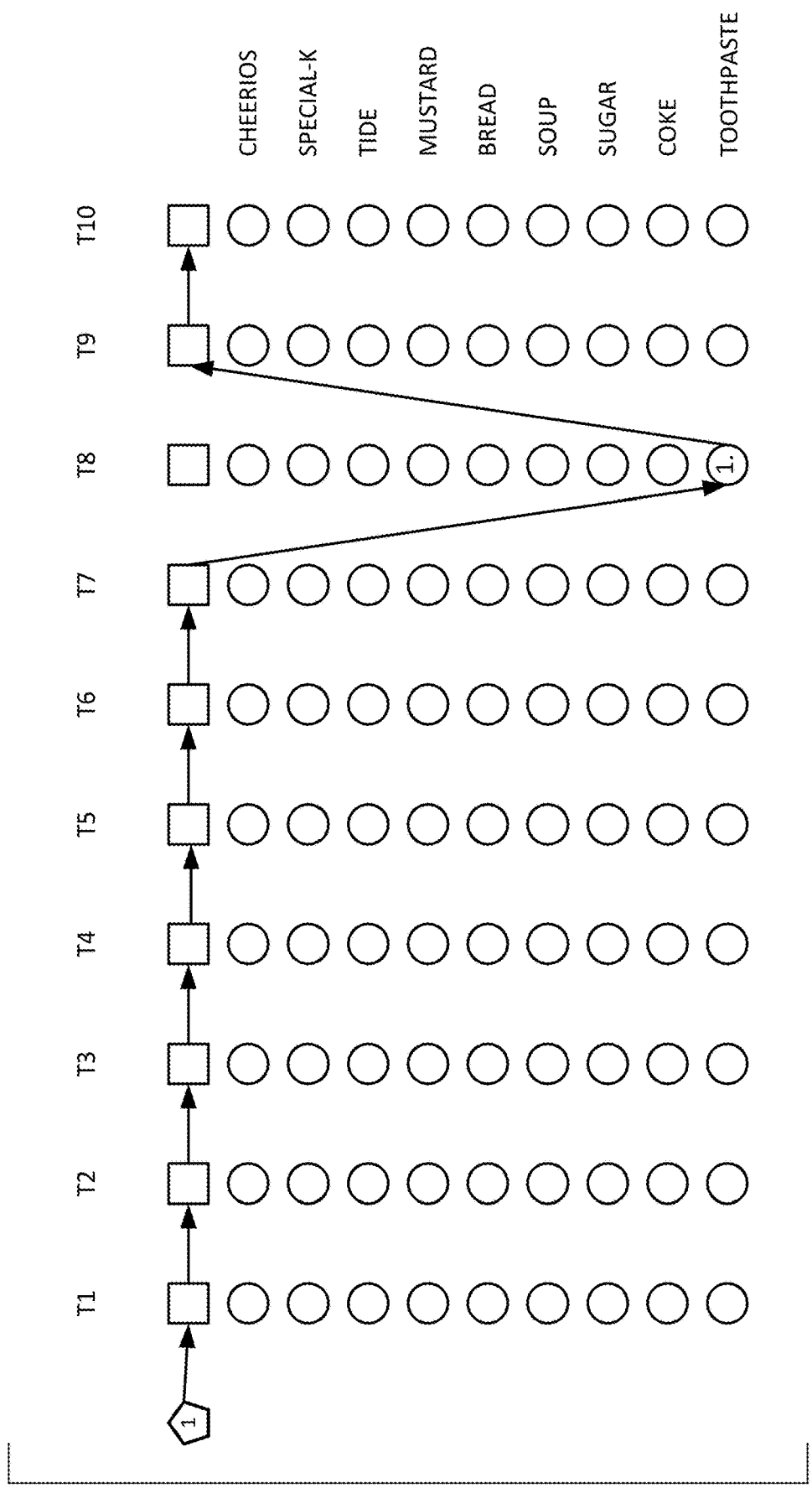
FIGS. 11A-11D are trellis diagrams corresponding to four shoppers, according to an illustrative implementation employing certain principles of the present technology.

The number within nodes through which a track passes indicates the probability (confidence) that the shopper picked up that item. In the illustrated embodiment, the probability ranges from 0 to 1, with 1 being 100% confidence that this shopper picked up this item. FIG. 11A indicates such certainty that shopper 1 picked up the toothpaste.

Figure 11B:
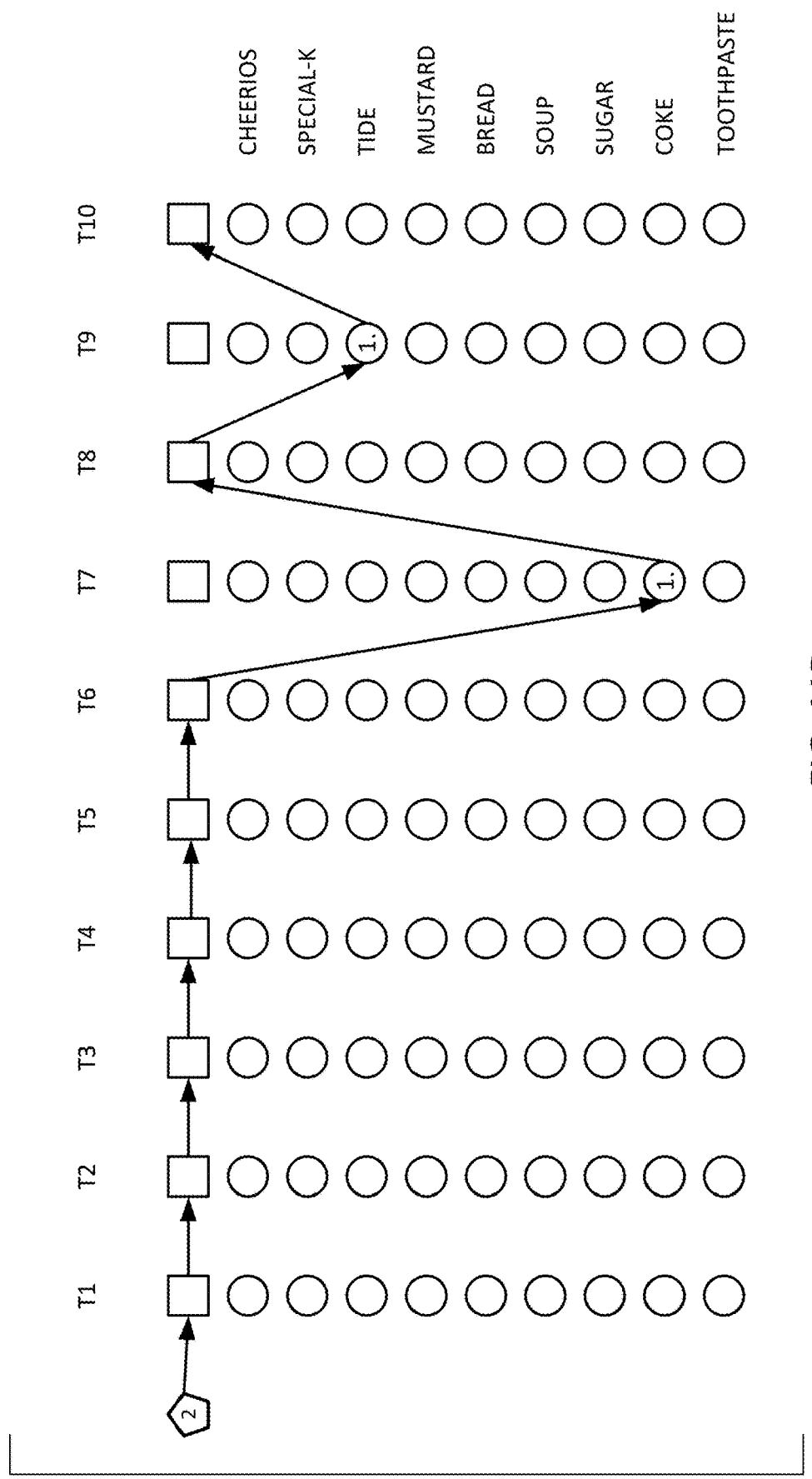

FIG. 11B shows that shopper 2 picked up both Coke soft drink and Tide detergent, based on the spatial- and temporal-coincidence of shopper 2 at those shelf locations at the time points when withdrawal of such items was sensed.

Figure 11C:
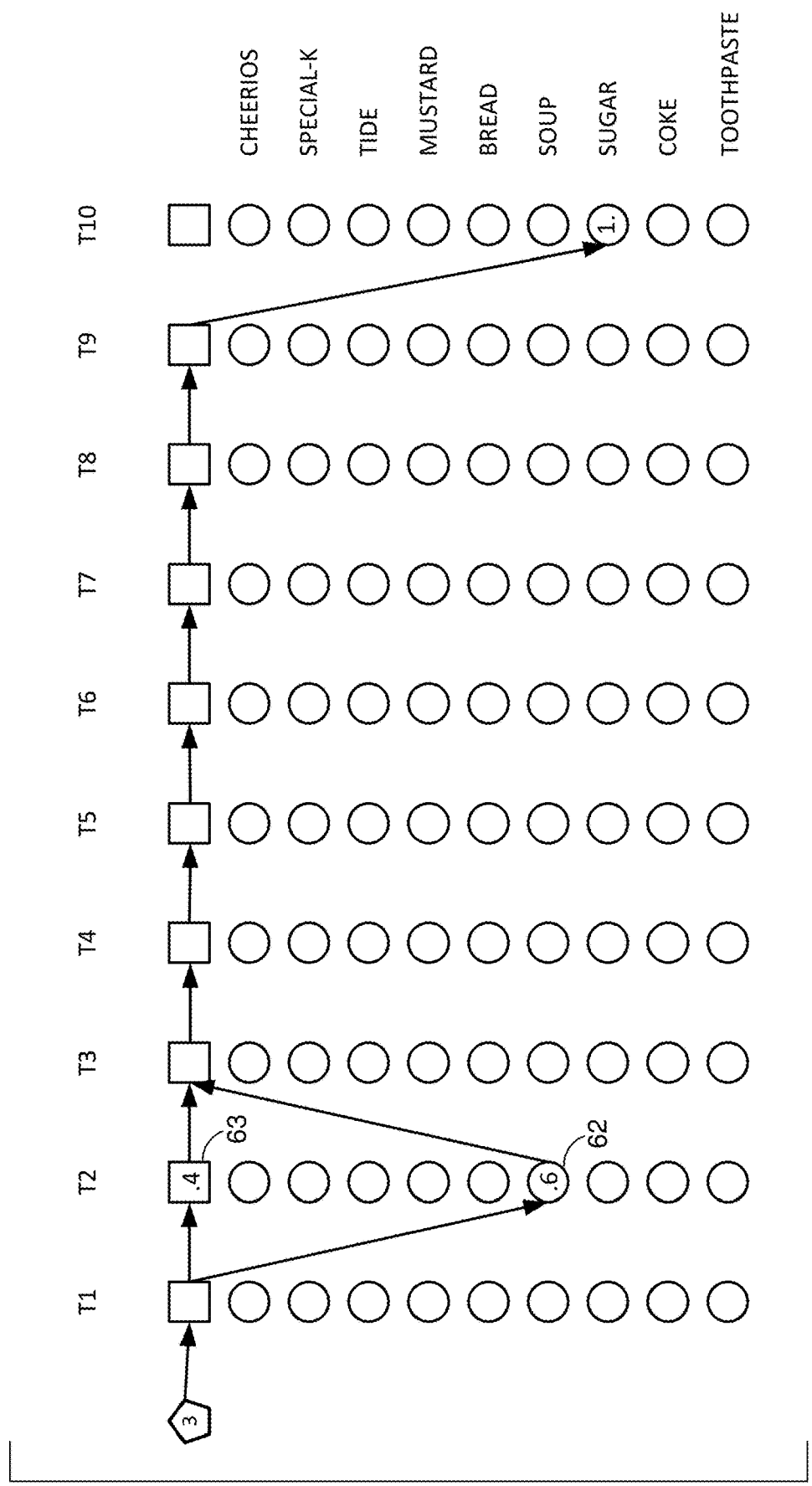

FIG. 11C is a bit more complex. It shows, at time point 2, two alternative tracks through the lattice diagram. One passes through the square box at the top of the column. The other passes through a node 62 indicating that shopper 3 picked up a can of soup. The latter node indicates a probability of 0.6; the former square node indicates a probability of 0.4. The probability of 0.6 is computed based on a system determination that shopper 3 was not exactly coincident—in time or space—with the removal of the soup from its shelf location. Shopper 3 may, for example, have been sensed a few feet away from the soup's shelf location at the instant when its withdrawal was sensed. Or shopper 3 may have been sensed at the soup's shelf location, but not until a few seconds after its withdrawal was sensed.

In an illustrative arrangement, the probability depicted in node 62 is computed by a programmed processor in accordance with a software algorithm that depends on both a spatial- and a temporal-distance between the user and the item removal event reported in FIG. 9. A particular such algorithm for computing this probability, p, may take the form of a polynomial equation:

$$p=\theta_1+\theta_2 f(x)+\theta_3 g(y)+\theta_4 f(x)g(y)+\theta_5 (f(x))^2+\theta_6 (g(Y))^2+\theta_7 g(y)(f(x))^2+\theta_8 f(x)(g(y))^2$$

where:
p=1 if the value computed above is greater than 1;
p=0 if the value computed above is less than 0;
f(x) is a function of the spatial distance between the shopper, and the detected location where an item was removed, at the time point of such removal;
g(y) is a function of the time difference between the instant of the shopper's closest approach to the detected location where an item was removed, and the time point of such item removal; and
$\theta_1$-$\theta_8$ are constants.

In a simple implementation:

$$f(x)=(2-\Delta D);$$

$$g(y)=(2-\Delta T);$$

$$\theta_1=1;$$

$$\theta_2=0.4;$$

$$\theta_3=0.3; \text{ and}$$

all other $\theta$ constants=0
where:
$\Delta D$ is the spatial distance between the location along a shelf at which item removal was sensed, and the shopper's location at the time point of item remove, in units of a half-foot; and
$\Delta T$ is the time difference between the time point at which item removal was sensed, and the time point at which the shopper's track came closest to the shelf location where item removal was sensed, in units of seconds.

Thus, if shopper 3 was 18 inches further down the aisle from the shelf location where removal of the soup was sensed—at the moment of such removal, and reached a point closest to the location of such removal 2 seconds after the removal was reported, the probability value p would be computed as follows:

$$P=1+0.4(2-3)+0.3(2-2)=0.6$$

The probabilities of all nodes in one column of a trellis diagram desirably sum to 1.0. Thus, the probability for the square node 63 is 1−0.6, or 0.4. (In some instances, there may be probabilities associated with more than two nodes in a trellis diagram column.) If computed probabilities in a column sum to other than one, then the probabilities can be normalized, by dividing each by the column sum.

The right-most column in FIG. 11C indicates that shopper 3 picked up an item of sugar with 100% probability.

Figure 11D:
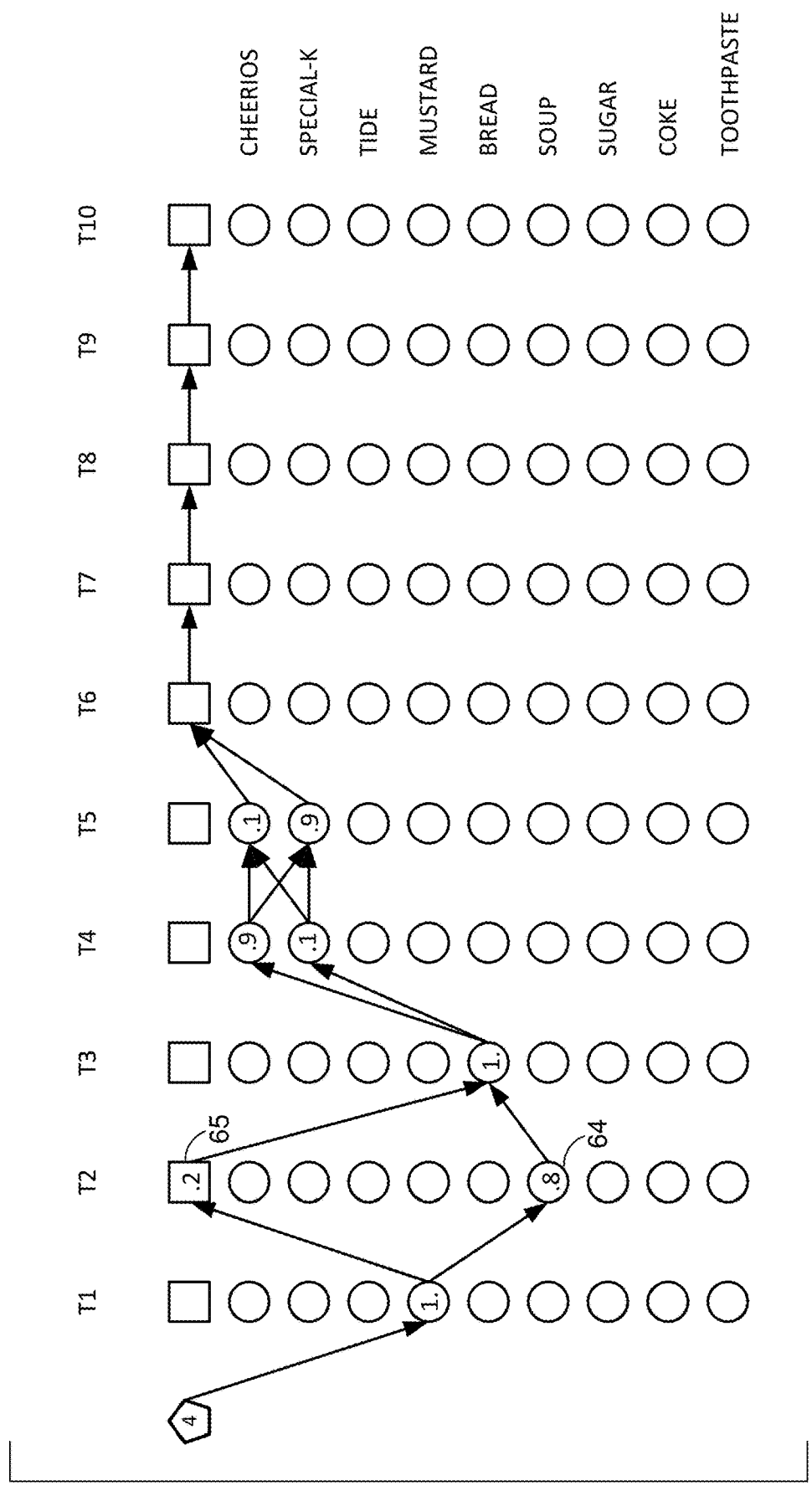

More insight into the soup's story is provided by FIG. 11D. It indicates that shopper 4 was also in the vicinity of the soup at the time point of its removal, in circumstances that yielded a probability of 0.8 (i.e., at node 64). Thus, the algorithm indicates that both shoppers 3 and 4—more likely than not, picked up the soup. But the numbers indicate that the greater probability lies with shopper 4.

FIG. 11D tells another story at time points T4 and T5. Two boxes of cereal were removed from a shelf, close in time, and the data indicates shopper 4 took both of them.

The store computer system can assess the likely basket contents for all shoppers in the store periodically, such as once a minute, by determining probabilities for different item-shopper assignments. A final reassessment can be performed as each shopper leaves the aisles of the store and heads for the exit, or for the customer service desk at the front.

The computer can note circumstances like that involving shoppers 3 and 4 and the soup, in which conflicting hypotheses are indicated (e.g., indicating both shoppers likely have the item). The probability scores in the involved nodes can be revised based on consideration of all the shoppers in the store who have any scores relevant to the soup. In the illustrated case, if only shoppers 3 and 4 are candidates to have taken the soup, their respective probabilities can be summed (0.6+0.8=1.4), and the probabilities in nodes 62 (FIG. 11C) and 64 (FIG. 11D) can be normalized to 0.43 and 0.57, respectively. The square nodes 63, 65 at the top of these columns can be revised to 1−0.43, and 1−0.57 respectively.

(Other factors may also prompt revisions of these probabilities, as discussed later.)

To determine the likely contents of each basket, each of the trellis diagrams is navigated from side to side, following each possible path (i.e., passing through one node in each column), summing the encountered probabilities. This sum serves as a figure of merit associated with assignment of a particular list of items (i.e., the item nodes traversed) to that shopper. The path through each diagram that yields the greatest sum indicates the most likely contents of that shopper's basket.

FIG. 12 shows the result of such assessment, after nodes 62-65 have been revised as detailed above. The highest-sum track for each basket is indicated with a bold rectangle.

Probabilities can also be tailored to shopper history. For example, in the equation given above for estimating the probability p that a particular shopper S picked a particular item from the shelf, the constant $\theta_1$ can be augmented by an amount dependent on that shopper's history of purchasing that item. For instance, the shopper's past year of purchases can be analyzed to determine the average number of times such item has been purchased per week, and this value can be added to the constant $\theta_1$ normally used. (If the shopper has purchased a carton of buttermilk 13 times in the last 52 weeks, $\theta_1$ can be set to 1.25, instead of 1, in computing the value p for that shopper picking buttermilk.) It will be recognized that shopper history may be maintained in an anonymous fashion, such as when the store communicates with a shopper's smartphone identified by a unique customer ID that is not linked to a customer's name.

The exemplary equation parameters, given above, assume that the shopper's position can be determined with an accuracy on the order of a foot. With coarser shopper location data, history becomes a more important element in estimating item-shopper assignments.

Other factors can be considered in reaching shopper-item probability scores, as discussed below.

The above-detailed arrangements work not just with packaged consumer goods (which are routinely marked with barcodes), but also with produce items and bulk items (which are not). With such items, the shopper commonly bags and weighs their selection, and places it into the basket. A label is not needed. Data from the scale, indicating the item and its weight/count, is sent to the store computer and entered in the data structure of FIG. 9. The shopper's detected presence in front of that scale associates the item with the shopper.

Figure 13:
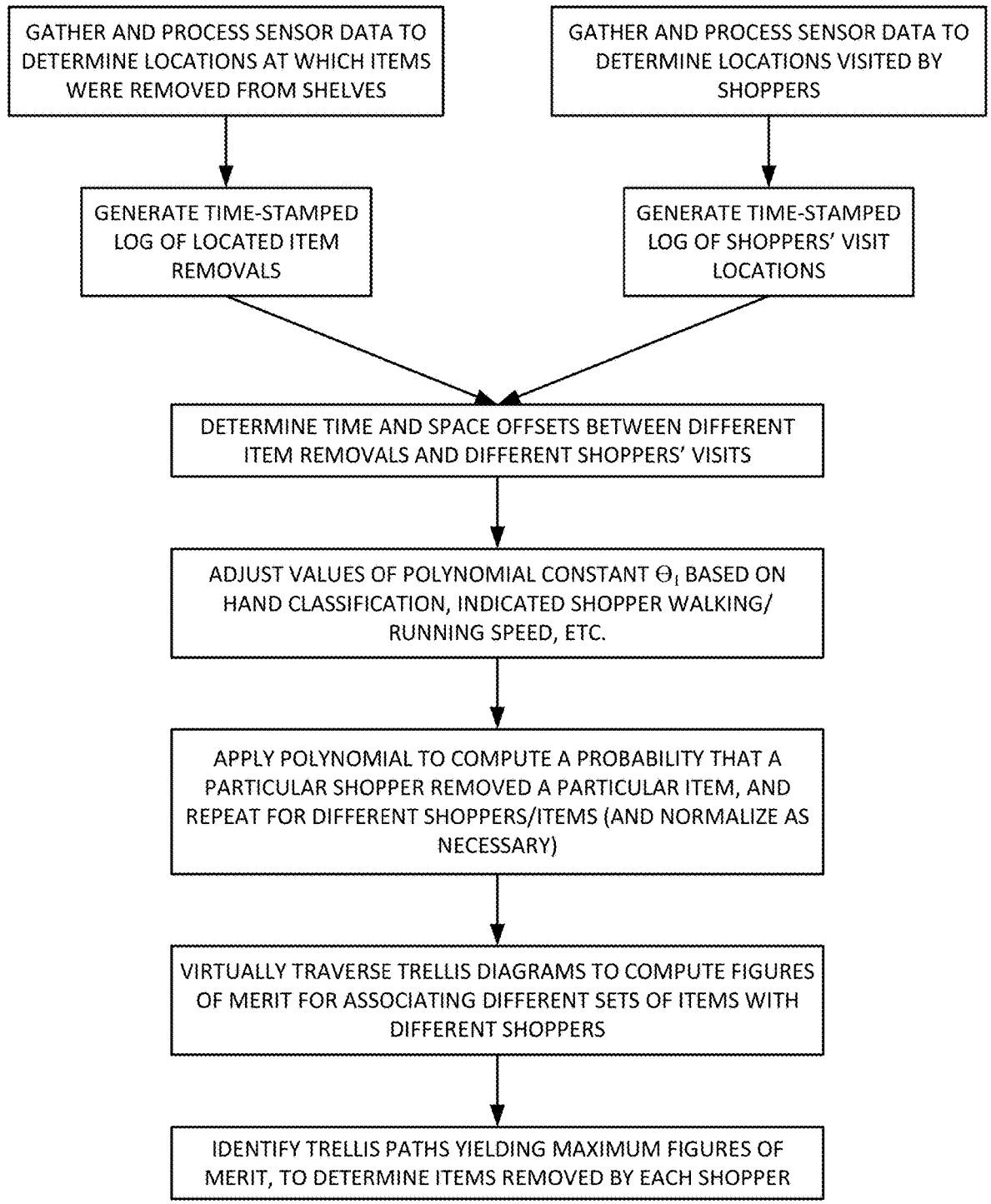
FIG. 13 is a flow chart illustrating certain aspects of one particular embodiment of the present technology.

FIG. 13 illustrates certain of the above-detailed aspects of the present technology, for one particular embodiment.

Other Factors Useful in Associating Items with Shoppers

In some arrangements, imagery of the shopper's hand— e.g., captured by a camera as the hand reaches to pick up an item from a shelf—can be used to associate items with respective shoppers. Although the store computer system desirably is not able to obtain personally identifiable information from a hand image, a hand image can provide a strong logical link between items in a particular shopper's basket.

Returning to the earlier example, if the hand that removed a package of sugar from a shelf was identified as likely a male left hand without any jewelry, and with a visible shirt sleeve, whereas a hand that lifted the can of soup from its shelf was identified as likely a female right hand with a ring on the fourth finger, and no detected shirt sleeve, then it is unlikely that the sugar and the soup were selected by the same shopper.

A machine vision classifier, based on a deep convolutional neural network, can be trained to determine the presence of a hand in imagery, and to classify a type of the detected hand. Suitable classifier networks are detailed in Krizhevsky, et al, Imagenet classification with deep convolutional neural networks, Advances in Neural Information Processing Systems 2012, pp. 1097-1105; Babenko, et al, Neural codes for image retrieval, arXiv preprint arXiv:1404.1777 (2014); and Simonyan, et al, Very deep convolutional networks for large-scale image recognition, arXiv preprint arXiv:1409.1556. 2014 Sep. 4.

Such networks can be trained to activate one of several respective output nodes depending on whether the hand appears to be one or more of, e.g.: male/female/ambiguous; juvenile/middle-aged/elderly; with/without wristwatch; with/without shirt sleeve; with/without one or more rings on a wedding finger; and with/without one or more rings on any other finger. The classifier may further be trained to distinguish right hands from left hands (reasoning that shoppers may consistently use the same hand in picking items).

Figure 14A:
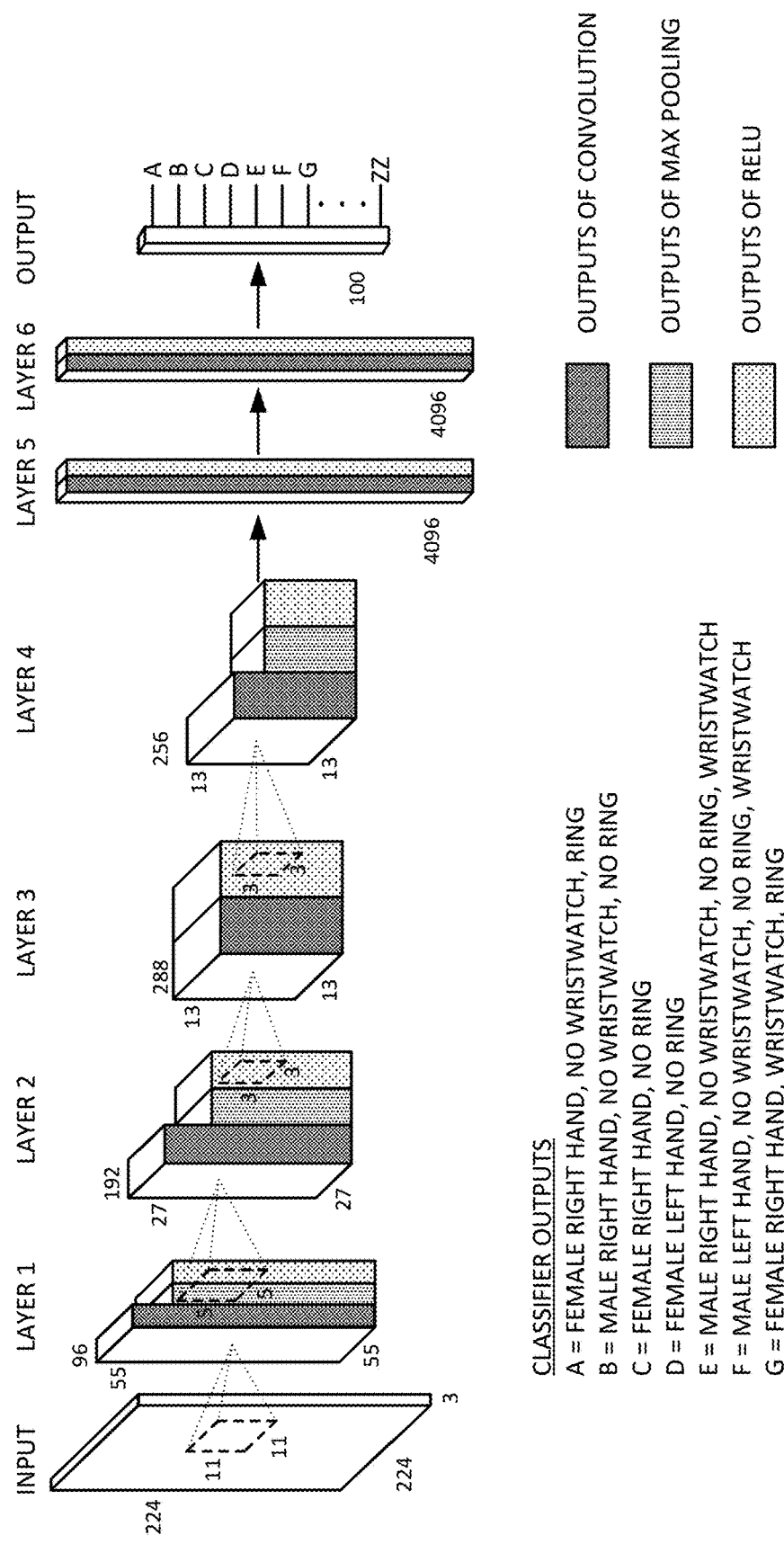
FIGS. 14A and 14B show exemplary hand classification neural networks used in illustrative embodiments of the present technology.
Figure 14B:
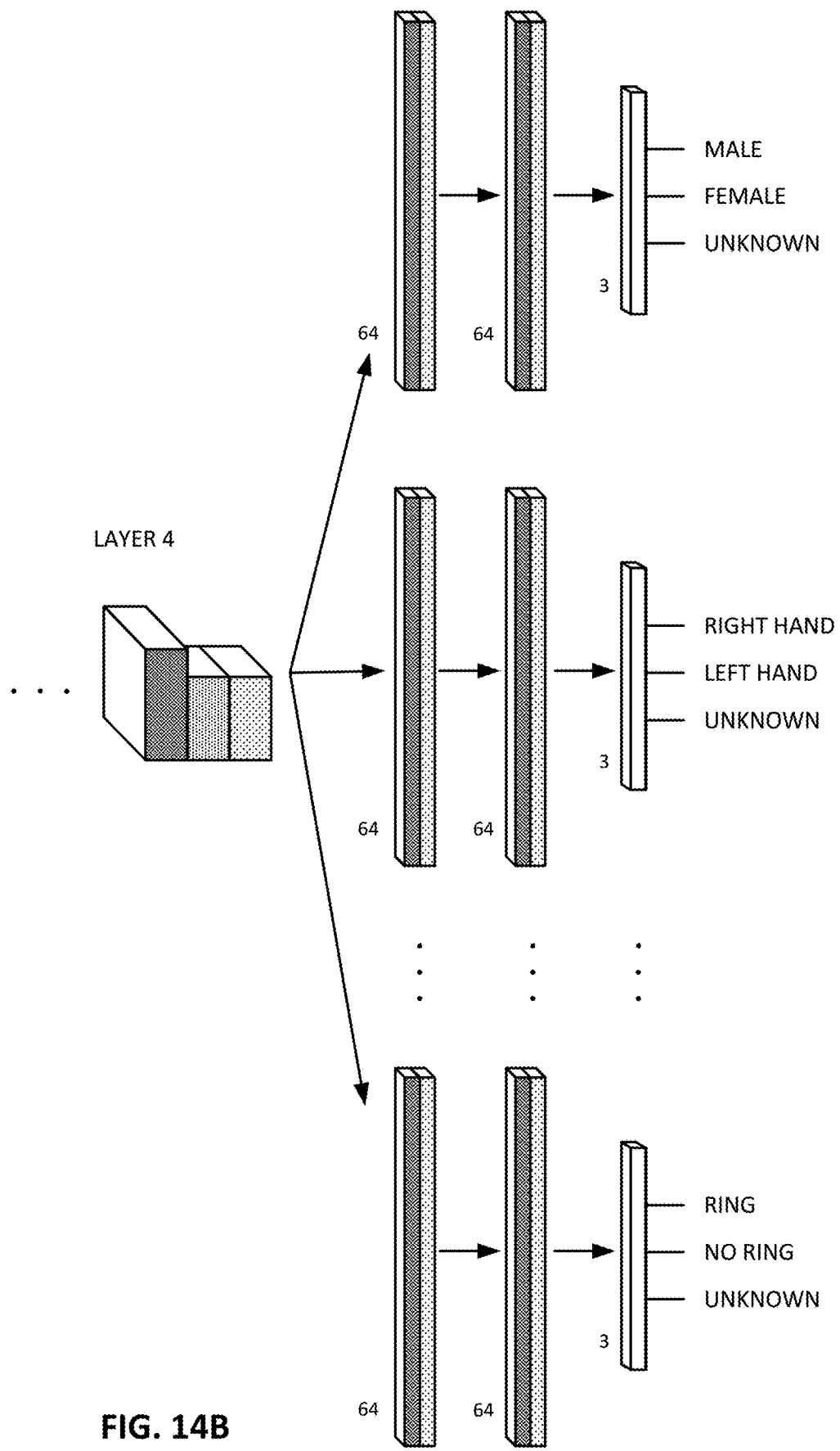

FIGS. 14A and 14B detail illustrative neural networks, modified from Krizhevsky and Babenko. FIG. 14A is a single network, in which each output identifies (in most instances) a combination of hand/arm attributes. FIG. 14B is similar, but the final convolution stage provides feature data to several smaller output stages, each of which uses the feature data to reach a conclusion about a single type of hand/arm attribute. Different such arrangements, and indeed different networks, can naturally be used.

As is familiar to artisans, the training of such a convolutional network to recognize and distinguish various image classes can be performed using labeled training images, and back-propagation techniques, such as stochastic gradient descent. Such training algorithms are included in popular deep learning frameworks, such as Google's TensorFlow and U.C. Berkeley's Caffe.

A suitable corpus of training images may be compiled by capturing images from cameras 31 in a supermarket for a month or so, whenever motion is detected in the field of view, and then submitting such images to human reviewers who enter classification data (e.g., "Is there a hand in this image? If so, is it the hand of a man, a woman, or indeterminate?"). Amazon's Mechanical Turk can be used in this process.

The Krizhevsky and Babenko papers, together with Wikipedia articles for Deep Learning, Convolutional Neural Networks, and Stochastic Gradient Descent, are attached to, and form part of, application 62/445,667. The Simonyan paper is attached to, and forms part of, application 62/596,730, filed Dec. 8, 2017. These patent applications are incorporated herein by reference.

Such hand data can be used in various ways in influencing the probability scores. A simple approach is to develop a nominal hand classification for each shopper, based on a consensus of those hand depictions captured when a particular shopper picked items for which there is 100% item-shopper probability (e.g., based on time/proximity metrics, as above). For example, if a majority of the items that are associated with shopper "A" with 100% probability (e.g., based on time/distance metrics) are picked with a hand that is classified as middle age/right hand/female/ring on fourth finger, then this {middle age/right/female/ring} classification is the nominal classification for shopper A.

If an item cannot be associated 100% with shopper A based on time/place metrics, then the hand factor can be used to increase the probability, if that item was picked with a hand classified as {middle age/right/female/ring}. For example, the value of 01 may be increased, such as by summing with a positive value (e.g., 0.5) or by multiplying by a value greater than 1 (e.g., 1.5). Inversely, if that item was picked width a hand that is not classified as {middle age/right/female/ring}, then the value of Oi may be decreased, such as by summing with a negative value (e.g., −0.5) or by multiplying by a value less than 1 (e.g., 0.75).

In FIG. 14A, the lines from the output stage are labeled A-ZZ. These can indicate different classification outputs, e.g., A=FEMALE RIGHT HAND, NO WRISTWATCH, RING
B=MALE RIGHT HAND, NO WRISTWATCH, NO RING
C=FEMALE RIGHT HAND, NO RING
D=FEMALE LEFT HAND, NO RING
. . .
G=FEMALE RIGHT HAND, WRISTWATCH, RING
. . .
ZZ=INDETERMINATE Some hand type classifications may be made with greater confidence than others. For example, the presence vs. absence of a ring may be more confidently assessed than whether the shopper is either a middle-aged man or an elderly man. Different adjustments to the probability can be made, in accordance with the confidence of the network in classifying the hand type.

A great number of different adjustments to item-shopper probabilities can be based on hand type information—many that are more complex than the simple examples above.

Another parameter that can be considered in estimating item-shopper assignments is the transit speed of shopper movement through the store, as indicated by the FIG. 10 data. If data in the FIG. 10 table places a shopper "A" at aisle 1 at one moment, and at aisle 4 two seconds later, then something is amiss. (Perhaps shopper A and a shopper B were briefly in close proximity, and an image-based blob tracking module confused the two—thereafter believing shopper B was actually shopper A, and vice-versa.) Item-shopper assignments after such hyperspeed shopper relocation can be assigned lower probabilities, in view of the questionable data. For example, the value of $\theta_1$ can be set to 0.5 in computing probabilities for items that are associated with shopper A after this sudden and improbable reported positioning of shopper A in aisle 4. (Such speed-based factors are further elaborated below.)

If a shopper is associated with identification data that is persistent across multiple visits to a store (e.g., by credit card number, or by smartphone app identifier), then that shopper's habits in the store (e.g., track data) can be discerned, and compared against the current apparent track through the store, to assess confidence in today's estimated information.

Consider historical data for a shopper A that indicates a habit of shopping on Monday afternoons, serpentining up aisle 1 (FIG. 3), down aisle 2, up aisle 3, picking up milk in aisle 5 where indicated, and then proceeding down aisle 4 to the customer service desk. If this week, a shopper identified as shopper A (e.g., upon checkout with a credit card, or possibly earlier if the shopper has a smartphone app that provides a consistent identifier) appears on Monday, and track data indicates he shops along aisle 1, and then picks up milk in aisle 5, and then serpentines through aisles 2 and 3 before returning to pick up (another) milk in aisle 5, and then proceeds through aisle 4 en route to the customer service desk, then that first milk pickup looks suspect. The assignment of that first milk to shopper A should probably be given a confidence value below that given to the assignment of the second milk to shopper A.

The current track of a shopper can be compared against a historical average, and a delta metric can be computed at various points in the shopper's track—indicating how similar or different today's track is from historical norms at these different points. These points can be, e.g., time points.

For example, the historical (average) visit to the store by shopper A may be normalized on a timescale from 0% to 100%, with 0% being the time-point when the shopper enters the store, and 100% being the time-point when the shopper leaves the store. (Normalization is desirable since the shopper may move more slowly if fulfilling a longer shopping list, or if the store is crowded; yet basic route patterns tend to be consistent for most shoppers.) Such historical time-point data may indicate that shopper A visits the milk area of aisle 5 at a time-point of 85% through the shopper's average visit to the store. In the example just-given, where shopper A visited the milk area twice, these may correspond to time-points of 30% and 90%. A delta value for the first visit may be computed as the difference between the norm (85%) and today's first visit (30%), or 55%. The delta value for the second visit may similarly be computed as the difference between 85% and 90, or 5% (absolute values may be used). These delta values may be employed to adjust the corresponding probabilities of shopper A picking up items on these two visits to the milk area of aisle 5. One such adjustment is to subtract half of the delta value from an assignment probability that is computed based on the earlier-detailed metrics. Thus, the first milk pick-up is assigned to shopper A with a probability that is reduced by 0.275, and the second milk pick-up is assigned to shopper A with a probability that is reduced by 0.025. If both probabilities would otherwise by 1.0, this yields respective probabilities of 0.725 and 0.975. Again, these probabilities are used in the shopper's associated trellis diagram.

More generally, it will be recognized that the present technology associates location data with other sensor data to form estimates of item-shopper assignments. This approach is flexible and can resolve ambiguous assignments using maximum likelihood or Bayesian cost functions. A particular approach is based on a trellis diagram which depicts possible item-shopper assignments as they progress over time with availability of more data.

More particularly, a candidate set of one or more item-shopper assignments are identified for each item. A figure of merit for each item-shopper assignment is quantified using an estimate of probability. The candidate assignment, for each item, having the highest aggregate probability is finally selected when the shopper is ready to exit the store.

Once a set of item-shopper assignments is determined, each node in the trellis is assigned a metric which estimates the probability of the assignment. Then, the assignment problem is solved by finding an optimal set of item-shopper assignments across the trellis.

The aggregate probability value can be thought of as a cost function. Usually, cost functions are minimized. Here, however, the function is maximized—seeking to select the item-shopper assignments that yield the highest aggregate probability. A variety of other cost functions can be employed—and either minimized or maximized, as befits the particular implementation. (A cost function that is to be maximized, rather than minimized, may be termed a benefit function, although this terminology is not commonly used.)

One alternative cost function is based on estimates of ambiguities about each item-shopper assignment. Ambiguity may be regarded as the difference between the probability, and 100%. Ambiguities may be summed through each path of the trellis diagram (e.g., FIGS. 11A-11D), and the path with the lowest aggregate ambiguity can be selected as optimum.

Although each column in the depicted trellis diagrams is associated with a different time point, there may be instances in which two or more columns are associated with the same time point. Such instances can arise, for example, when two or more items are withdrawn from their respective shelf locations at the same time stamp.

Yet another factor that can help refine item-shopper assignments is trajectory information. Consider shoppers A and B, simultaneously paused at a shelf of yogurt. A container of strawberry yogurt is removed from its shelf location, midway between the two shoppers. Shopper A is 18 inches to the right of the shelf location, and shopper B is 18 inches to the left of the shelf location. What then? Can an estimate that is better than simply assigning the yogurt to each of the shoppers, with a 50% probability, be achieved?

In this instance, sensor data, such as from a downward-looking camera 31, can be analyzed to estimate a direction of motion of items depicted in its captured video. If a hand is depicted as reaching from the right side, or if a round shape (the yogurt lid) is detected as traveling to the right side, then shopper A is more likely to have removed the yogurt than shopper B. The probabilities can be assigned based on the conclusiveness of the sensed imagery. For example, stored rule data may specify that if a hand is sensed from a given direction (right), and an object is sensed moving away from the shelf towards that direction (right), then the shopper in that direction (right) is assigned the item with 100% probability. If only a hand is sensed from a given direction, or an object is sensed moving away from the shelf towards a given direction (but not both), then the shopper in that direction is assigned the item with 75% probability, and the other shopper is assigned the item with 25% probability. (If contradicting trajectory data is sensed, such as a hand entering from the right, and a round object moving to the left, then the rules can leave the probabilities at 50%-50% for the two shoppers.)

Figures 15A, 15B:
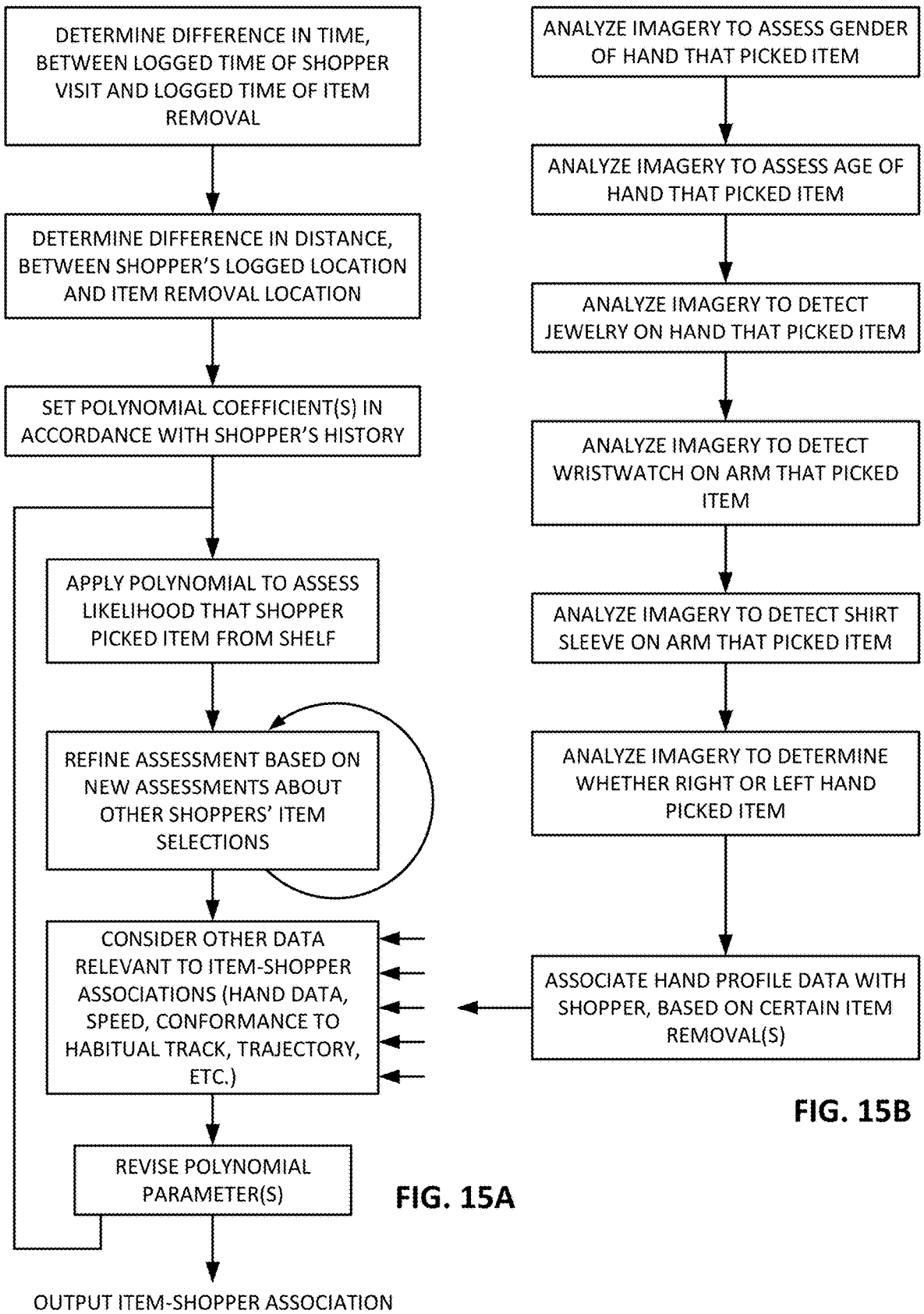
FIGS. 15A and 15B are flow charts detailing certain aspects of illustrative embodiments of the present technology.

FIGS. 15A and 15B illustrate certain of the foregoing aspects of the technology.

Checkout

As noted, when a shopper approaches the front of the store, a final probabilistic assessment is desirably made of that shopper's basket contents. Sometimes the assessment will be unambiguous. Other times, there will be a range of uncertainty.

Referring again to FIG. 12, the system can conclude that shopper 4—not shopper 3—probably picked the soup from the shelf. But probability sometimes is contrary to fact.

If shopper 3 approaches the front of the store first, they can rest their basket on a counter of a customer service desk or bagging station that is equipped with a weight sensor. The measured weight will quickly indicate whether a can of soup and a bag of sugar are present, or just a bag of sugar. If extra weight consistent with a can of soup is detected from the basket of shopper 3, that item is added to the checkout tally. Additionally, the tally of shopper 4—still in the aisles of the store—is updated, to set the probability of trellis node 64 to zero; the system knows shopper 4 does not have the soup. (Additionally or alternatively, store-provided baskets and totes may be equipped with integral weight sensors, which wirelessly report weight data for their aggregate contents to a store computer, allowing such disambiguation to be performed prior to either shopper checking out.)

In another embodiment, a weight check is omitted. Instead, a customer service clerk simply asks shopper 3 if they have soup in their tote—based on a prompt provided to the clerk from the computer system, which is alert to the ambiguity and the presence of the shopper approaching the front of the store). Or such a query can be sent to the shopper's mobile device by text messaging or other wireless communication.

In yet another arrangement, a machine vision system at a bagging station counts the number of items that shopper 3 moves from the shopping basket to a bag. (Such a system may be able to count items without recognizing them.) If two items are moved, one is the soup. If only one item is moved, the soup is known to be with shopper 4.

In still a further arrangement, a camera system at the bagging station analyzes captured imagery for an image excerpt that looks like the can of soup. (The camera is desirably oriented so as not to capture personally identifiable information from the shopper.)

In still another arrangement, the system may be configured to present a user interface on the shopper's smartphone app, inquiring whether they picked up a can of soup during their shopping. The user taps Yes or No, and this data is sent back to the store system. Relatedly, a touch screen terminal at the bagging station, where the shopper may finalize the payment transaction, can ask the same question.

In all such cases, the tally of shopper 3, and the trellis diagram for shopper 4, are revised in accordance with the further information.

Some retailers may take a different tack. Recognizing the imperatives of profitability and customer retention, a store may configure its system to give shoppers the benefit of a doubt. If plural probabilistic basket assessments (e.g., as cataloged in FIG. 12) are within a threshold score of each other (e.g., 0.5 in an illustrative embodiment), the store may elect to charge the shopper for whichever basket tally is the least expensive. In this case, neither shopper 3 nor shopper 4 is charged for the soup. The store loses $0.89 in revenue. But its labor cost is reduced; the shopper gets home a moment sooner; and—if the shopper notes the omission, the shopper may return to the store next time with a modicum of indebtedness that may help build loyalty. The benefits outweigh the costs.

(Such "benefit of the doubt" policy can be subject to certain requirements. One is the dollar amount of the ambiguity. It is easier to overlook $0.89 than $8.99, so a dollar limit may be placed on invoking this policy. It may also depend on the shopper's history at the store. If a shopper is known to be a regular patron, returning one or more times every week, then a greater dollar limit may be overlooked than for a customer who has no history at the store. U.S. Pat. No. 6,672,506 details systems for deciding how much audit scrutiny should be given to different self-checkout customers in different fact situations, and such technology can reciprocally be employed in deciding how much "benefit of the doubt" should be extended to shoppers employing the present technology.)

If more than a threshold number of items on a shopper's tally (e.g., 3) is identified with a probability less than a threshold confidence (e.g., 0.6), then the store computer may indicate that such shopper's basket needs to be checked manually. Such occurrence is rare.

After a final tally is established, a financial settlement typically occurs, such as by cash or credit/debit card.

One particular arrangement for settlement of the tally is through use of an electronic wallet, e.g., of the sort detailed in applicant's patent publication 20140244514. In that system, payment data is optically sensed from a smartphone display, but is not represented by a single image. Instead, payment key information is spread across a series of frames, in video fashion, assuring that no one can copy a single barcode image and go shopping and defraud another shopper's account. Moreover, the payment key has a limited period of validity, and is for one-time use only. After expiration of the predefined validity period, or after the single use, the payment key becomes worthless—further enhancing security.

Further Arrangements

While the above-detailed arrangements rely—in part—on a shopper being detected as proximate—in time and space—with an item when it is removed from a shelf, this is not essential. Assume, for instance, the system knows that there are N shoppers in the store, and knows shopping history data for each of these shoppers (which, as noted, can be achieved while maintaining shopper privacy). Further assume that the system knows the identities of the items that have been collectively removed from the shelves, today, by these shoppers (e.g., by means such as are detailed earlier). But there is no information tracking the shoppers' tracks through the stores, nor logging the sequence of item removals. Highly accurate item-shopper assignments can still be estimated.

As step 1, the system examines the list of removed items today, and compares them against the N shoppers' histories. For each such item removed today, which appears only in one shopper's previous history, that item is added to that shopper's current tally, with a high confidence. For example, if the trellis construct is maintained, such items may be assigned to such shoppers with a confidence of 0.7 or 0.9, in accordance with stored rule data. This leaves two classes of items: (a) items that have been historically been purchased by multiple shoppers now in the store, and (b) items that have never been purchased by any shopper in the store.

As step 2, an object in the first class (i.e., an item purchased by multiple shoppers) is assigned to each of its previous purchasers, with a respective probability that is based on (i) purchase frequency data, and/or (ii) co-occurrence data.

If two shoppers have previously purchased a particular container of baking powder, the baking powder is added to the trellis diagram for each. The probabilities associated with these assignments is determined based on an algorithm, or rule, dependent on the relative frequency of such purchases in the past. If shopper A has purchased baking powder four times in the past year, and shopper B has purchased that baking powder one time in the past year, an initial probability distribution would be 0.8 for shopper A (i.e., 4/(4+1)), and 0.2 for shopper B (i.e., 1/(4+1)).

These probabilities can be adjusted based on historical co-occurrence of the baking powder being purchased with other items on the shoppers' tallies. For example, if in step 1, a pint of half-and-half of a particular brand was associated with shopper A, and shopper A's history shows one or more instances of buying that half-and-half on the same day as buying that baking soda, then the division of probabilities between shopper A and B (i.e., 0.8 and 0.2) can be adjusted to further favor shopper A, e.g., by adding an increment (e.g., 0.1) to the 0.8 probability, or by multiplying the 0.8 probability by a factor larger than 1.0 (e.g., 1.1). The probability for shopper B can be reduced accordingly so that the shopper assignment probabilities for the baking powder sum to 1.0 (unless co-occurrence data based on an item in shopper B's tally also indicates a boost to that shopper's probability, in which case the probabilities for shoppers A and B may be left unchanged by such co-occurrence data, or may be adjusted differently depending on the respective strengths of such co-occurrence factors).

The just-discussed co-occurrence data is personal to the shopper. More general co-occurrence data, derived from a larger pool of shoppers (e.g., all shoppers at the store in the past month or year) can also be used—either in addition to personal co-occurrence data, or by itself.

For instance, if shopper A was assigned a bag of chocolate chips in step 1, and shopper B was assigned a bottle of lemon juice in step 1, historical data across all store shoppers in the past month may indicate that 14 shoppers who bought bags of chocolate chips also bought the subject box of baking powder, while only 2 shoppers who bought the bottle of lemon juice also bought the subject box of baking powder. This indicates a 14:2 greater probability—based on this co-occurrence factor—that shopper A has the box of baking soda. The probabilities earlier determined for assignment of the box of baking soda can be adjusted accordingly. For example, the 0.8 probability can be multiplied by 14, and the 0.2 probability can be multiplied by 2, and the results re-normalized to sum to 1, yielding a probability of 0.966 that shopper A has the baking soda, and a probability of 0.034 that shopper B has the baking soda.

The remaining class of items—items that none of the shoppers in the store has previously purchased—can be assigned to the shoppers similarly, based on general co-occurrence data involving items already associated with such shoppers' tallies. For instance, consider a jar of capers that has been removed from the shelves. No one in the store has previously purchased capers. But general co-occurrence data indicates that capers have been sold one time in the past month in co-occurrence with particular pasta noodles, and nine times with smoked salmon. In this case, a current shopper whose tally includes those pasta noodles may be assigned the capers with a probability of 0.1, and a current shopper whose tally includes smoked salmon may be assigned the capers with a probability of 0.9.

As in the earlier examples, each time a shopper approaches the customer service area of the store, that shopper's trellis diagram is navigated to determine the most probable tallies. At the customer service area, certain ambiguities about the tally may be resolved. For example, checkout may resolve, e.g., by weight, computer vision, smartphone or spoken inquiry, that the shopper has, or does not have, a particular item. Resolution of shopper A's tally can have a ripple effect on the probabilities for tallies of shoppers still in the store. Again, some uncertainty may be permitted, with the store giving a benefit of the doubt to certain shoppers—charging the lower of two candidate tallies.

By such arrangement, items can be assigned to shoppers' tallies without regard to the times that shoppers were at different locations of the store, or the times that different items were removed from the shelves. Just knowing the shoppers' purchase histories, and the aggregate items removed, is sufficient.

Further refinement can be applied by knowing the timestamps of item removals throughout the store—even if the shopper's path through the store is not tracked. If a can of anchovies is removed from aisle 1 and, three seconds later a bag of potato chips is removed from aisle 3, it is improbable that they are both in the same basket. If the can of anchovies is a historical favorite of shopper A (e.g., purchased five times in the past year), but has never been purchased by any of the other shoppers present, then the bag of potato chips is most likely not in shopper A's tally.

These history-based probabilities can be quantified in various ways, as may be selected by the system designer. One approach is to assign an initial item-assignment probability k based on a number of times N that a particular shopper has purchased a particular item in the past year, as compared to the aggregate number of purchases M of that item, by all shoppers in the store, over the past year. An exemplary formula is:

$$k=0.2+0.8(N/M)$$

Such probabilities are computed for each shopper, for each item removed from the shelf while the shopper is in the store. As before, each of these probabilities is normalized so that the probabilities for each item, summed across all shoppers, equals 1.0.

A speed factor is then applied, based on a weighted average distance that each shopper must traverse to get to that item's location at the time-stamp that removal of such item was detected.

Consider shoppers A and B. A box of Cheerios is removed from aisle 1 at time 00:00:00 (hours:minutes:seconds). A box of Fruit Loops is removed from aisle 1 at time 00:00:05. A five-pound bag of sugar is removed from aisle 3 at time 00:00:12, and a bag of oatmeal is removed from aisle 1 at time 00:00:14.

Store planogram data indicates the Cheerios and Fruit Loops are five feet apart. The distance from the Fruit Loops to the sugar is 85 feet. The distance from the sugar to the oatmeal is 95 feet. (The distance from the Cheerios to the sugar is 80 feet; the distance from the Cheerios to the oatmeal is 15 feet; the distance from the Fruit Loops to the oatmeal is 10 feet.) FIG. 16 depicts this layout of items in the store of FIG. 3.

Shopper A has never bought Cheerios or Fruit Loops, but shopper B has. So initially, the probabilities k, per the above formula, for each of the cereals is 0.2 to shopper A, and 0.8 to shopper B. Both have purchased the sugar with equal frequency, so the sugar is initially assigned to each with a probability of 0.5. However, shopper A has bought the oatmeal three times in the past year, as compared with only once for shopper B. Using the above formula, the oatmeal is assigned to shopper A with a probability of 0.75, and to shopper B with a probability of 0.25.

There are 16 possible assignments of the four items. The probability of each possible assignment, considering these history factors only, is determined by multiplying the respective likelihoods of each item-shopper assignment.

The probability that shopper A picked all four items is 0.2*0.2*0.5*0.67, or 0.0134. This is equivalent to saying that shopper B picked none of the items.

The probability that shopper A picked the first 3 items, but not the oatmeal, is 0.2*0.2*0.5*0.33, or 0.0067. (The probability of a shopper not picking an item is one minus the probability k that a shopper picked that item—leading to the 0.33 term.) This is the same as shopper B picking only the peanut butter.

The below Table 1 details the 16 possible combinations of item selections ("Scenarios"), and the time of each item selection, for Shopper A ("X" indicates the item was selected by shopper A), together with the probability of each scenario—based on history alone:

TABLE 1

| Scenario | Cheerios (00:00:00) | Fruit Loops (00:00:05) | Sugar (00:00:12) | Oatmeal (00:00:14) | Probability k |
|---|---|---|---|---|---|
| A | X | X | X | X | 0.0133 |
| B | X | X | X |   | 0.0067 |
| C | X | X |   | X | 0.0133 |
| D | X | X |   |   | 0.0067 |
| E | X |   | X | X | 0.0533 |
| F | X |   | X |   | 0.0267 |
| G | X |   |   | X | 0.0533 |
| H | X |   |   |   | 0.0267 |
| I |   | X | X | X | 0.0533 |
| J |   | X | X |   | 0.0267 |
| K |   | X |   | X | 0.0533 |
| L |   | X |   |   | 0.0267 |
| M |   |   | X | X | 0.2133 |
| N |   |   | X |   | 0.1067 |
| O |   |   |   | X | 0.2133 |
| P |   |   |   |   | 0.1067 |

Next, a further factor j is developed, indicating the credibility that a shopper could have reached a location where an item was selected, based on a location where that shopper previously selected an item. That is, this factor is based on the apparent speed at which the shopper must have moved between two item locations in the store Table 2 provides a speed, in feet/second, needed by shopper A to reach each selected item, based on the distance from the item previously selected by that shopper. Thus, every location where an X appears in Table 1, now has a speed. (A speed of "1" appears for the first item in each row/scenario, because this example assumes that shopper A is already-present in the store, and may start shopping at any aisle location. "1" indicates a high credibility that the shopper could be at that location to select that item. In practical implementation, a computed speed-based credibility factor can be applied to the first item selected, instead of a "1"—based on the time from shopper A's entry to the store, to the first item selected.)

The top row in Table 2, for example, indicates that shopper A walked at 1 foot/second between selecting the Cheerios, and selecting the Fruit Loops. (As noted, these locations are 5 feet apart, and the items were selected 5 seconds apart.) Things get dubious, however, in the transit from the Fruit Loops to the sugar. These items were selected 7 seconds apart, but are separated by 85 feet, indicating shopper A ran at a speed of 12.1 feet/second. Also improbable is the next feat: shopper A moving from the sugar to the oatmeal (95 feet) in 2 seconds, for a speed of 47.5 feet per second.

The data in the other rows are computed similarly.

TABLE 2

| Scenario | Cheerios (00:00:00) | Fruit Loops (00:00:05) | Sugar (00:00:12) | Oatmeal (00:00:14) | Probability k |
|---|---|---|---|---|---|
| A | 1 | 1 | 12.1 | 47.5 | 0.0133 |
| B | 1 | 1 | 12.1 |   | 0.0067 |
| C | 1 | 1 |   | 1.1 | 0.0133 |
| D | 1 | 1 |   |   | 0.0067 |
| E | 1 |   | 6.7 | 47.5 | 0.0533 |
| F | 1 |   | 6.7 |   | 0.0267 |
| G | 1 |   |   | 1.07 | 0.0533 |
| H | 1 |   |   |   | 0.0267 |
| I |   | 1 | 12.1 | 47.5 | 0.0533 |
| J |   | 1 | 12.1 |   | 0.0267 |
| K |   | 1 |   | 1.1 | 0.0533 |
| L |   | 1 |   |   | 0.0267 |
| M |   |   | 1 | 47.5 | 0.2133 |
| N |   |   | 1 |   | 0.1067 |

TABLE 2-continued

| Scenario | Cheerios (00:00:00) | Fruit Loops (00:00:05) | Sugar (00:00:12) | Oatmeal (00:00:14) | Probability k |
|---|---|---|---|---|---|
| O |  |  |  | 1 | 0.2133 |
| P |  |  |  |  | 0.1067 |

Once the speeds of transit to successive item selections for shopper A are computed, a credibility factor j can be computed. In a simple example, factor j has a value of 1 if the speed is less than a threshold value x, such as 5 feet/seconds. Otherwise, the credibility factor j is computed as:

$$j = 1/(1 + \text{speed} - x)$$

Thus, if the speed is 6 feet/seconds, the credibility factor j is 0.5. Table 3 details the credibility factor for each of the items selected by shopper A in each of the 16 scenarios:

TABLE 3

| Scenario | Cheerios (00:00:00) | Fruit Loops (00:00:05) | Sugar (00:00:12) | Oatmeal (00:00:14) | Probability k |
|---|---|---|---|---|---|
| A | 1 | 1 | 0.123 | .023 | 0.0133 |
| B | 1 | 1 | 0.123 |  | 0.0067 |
| C | 1 | 1 |  | 1 | 0.0133 |
| D | 1 | 1 |  |  | 0.0067 |
| E | 1 |  | .37 | .023 | 0.0533 |
| F | 1 |  | .37 |  | 0.0267 |
| G | 1 |  |  | 1 | 0.0533 |
| H | 1 |  |  |  | 0.0267 |
| I |  | 1 | 0.123 | .023 | 0.0533 |
| J |  | 1 | 0.123 |  | 0.0267 |
| K |  | 1 |  | 1 | 0.0533 |
| L |  | 1 |  |  | 0.0267 |
| M |  |  | 1 | .023 | 0.2133 |
| N |  |  | 1 |  | 0.1067 |
| O |  |  |  | 1 | 0.2133 |
| P |  |  |  |  | 0.1067 |

Finally, a relative probability m for each scenario for shopper A is computed, in this example arrangement, by multiplying the earlier determined probability k (based on historical shopping experiences), with the credibility factor j for each of the item selections in a particular scenario, as shown in the following Table 4.

For example, in the first scenario, the historical probability k is 0.0133; the credibility factor j for shopper A's transit from the Cheerios to the Fruit Loops is 1; the credibility factor j for shopper A's transit from the Fruit Loops to the sugar is 0.123; and the credibility factor j for shopper A's transit from the sugar to the oatmeal is 0.023. The product of these factors is the relative probability m, i.e., 0.00004.

TABLE 4

| Scenario | Cheerios | Fruit Loops | Sugar | Oatmeal | Probability k | Probability m |
|---|---|---|---|---|---|---|
| A | 1 | 1 | 0.123 | .023 | 0.0133 | 0.00004 |
| B | 1 | 1 | 0.123 |  | 0.0067 | 0.00082 |
| C | 1 | 1 |  | 1 | 0.0133 | 0.01330 |
| D | 1 | 1 |  |  | 0.0067 | 0.00670 |
| E | 1 |  | .37 | .023 | 0.0533 | 0.00045 |
| F | 1 |  | .37 |  | 0.0267 | 0.00988 |
| G | 1 |  |  | 1 | 0.0533 | 0.05330 |
| H | 1 |  |  |  | 0.0267 | 0.02670 |
| I |  | 1 | 0.123 | .023 | 0.0533 | 0.00015 |
| J |  | 1 | 0.123 |  | 0.0267 | 0.00328 |
| K |  | 1 |  | 1 | 0.0533 | 0.05330 |
| L |  | 1 |  |  | 0.0267 | 0.02670 |
| M |  |  | 1 | .023 | 0.2133 | 0.00491 |
| N |  |  | 1 |  | 0.1067 | 0.10670 |
| O |  |  |  | 1 | 0.2133 | 0.21330 |
| P |  |  |  |  | 0.1067 | 0.10670 |

(It will be recognized that the relative probabilities m in Table 4 do not sum to 1.0, due to the nature of their derivation. But they are useful in a relative sense, e.g., with scenario O being more likely than scenario P, etc.)

It would seem that one of the last three scenarios, particularly scenario O, is the one that most likely indicates the activity of shopper A in the store. But more insight is obtained by conducting a similar analysis for shopper B, and reconciling the two.

Below is Table 5, which is like Table 1, but for shopper B. For consistency's sake, scenario A—which involved shopper A selecting all four of the items, is now maintained in inverse fashion: scenario A is shopper B selecting none of the items. Likewise for the following rows:

TABLE 5

| Scenario | Cheerios (00:00:00) | Fruit Loops (00:00:05) | Sugar (00:00:12) | Oatmeal (00:00:15) | Probability k |
|---|---|---|---|---|---|
| A |  |  |  |  | 0.0133 |
| B |  |  |  | X | 0.0067 |
| C |  |  | X |  | 0.0133 |
| D |  |  | X | X | 0.0067 |
| E |  | X |  |  | 0.0533 |
| F |  | X |  | X | 0.0267 |
| G |  | X | X |  | 0.0533 |
| H |  | X | X | X | 0.0267 |
| I | X |  |  |  | 0.0533 |
| J | X |  |  | X | 0.0267 |
| K | X |  | X |  | 0.0533 |
| L | X |  | X | X | 0.0267 |
| M | X | X |  |  | 0.2133 |
| N | X | X |  | X | 0.1067 |
| O | X | X | X |  | 0.2133 |
| P | X | X | X | X | 0.1067 |

As can be seen, the probabilities for the different scenarios are unchanged from Table 1. The analysis proceeds as above, yielding relative probabilities for shopper B as depicted in the following Table 6 (which corresponds to Table 4 for shopper A):

TABLE 6

| Scenario | Cheerios | Fruit Loops | Sugar | Oatmeal | Probability k | Probability m |
|---|---|---|---|---|---|---|
| A |  |  |  |  | 0.0133 | 0.01330 |
| B |  |  |  | 1 | 0.0067 | 0.00670 |
| C |  |  | 1 |  | 0.0133 | 0.01330 |
| D |  |  | 1 | 0.023 | 0.0067 | 0.00015 |
| E |  | 1 |  |  | 0.0533 | 0.05330 |
| F |  | 1 |  | 1.1 | 0.0267 | 0.02937 |
| G |  | 1 | 0.123 |  | 0.0533 | 0.00656 |
| H |  | 1 | 0.123 | 0.023 | 0.0267 | 0.00008 |
| I | 1 |  |  |  | 0.0533 | 0.05330 |
| J | 1 |  |  | 1 | 0.0267 | 0.02670 |
| K | 1 |  | 0.37 |  | 0.0533 | 0.01972 |
| L | 1 |  | 0.37 | 0.023 | 0.0267 | 0.00023 |
| M | 1 | 1 |  |  | 0.2133 | 0.21330 |
| N | 1 | 1 |  | 1 | 0.1067 | 0.10670 |
| O | 1 | 1 | 0.123 |  | 0.2133 | 0.02624 |
| P | 1 | 1 | 0.123 | 0.023 | 0.1067 | 0.00030 |

The final probability for each of the scenarios is dependent on the relative probability for each scenario for each shopper. In a simple embodiment, the respective relative probabilities are multiplied. Their product, as shown in Table 7, serves as a cost (or benefit) function, which in this case is to be maximized:

TABLE 7

| Scenario | Relative Probability m for Shopper A | Relative Probability m for Shopper B | Product |
|---|---|---|---|
| A | 0.00004 | 0.01330 | 0.00000 |
| B | 0.00082 | 0.00670 | 0.00001 |
| C | 0.01330 | 0.01330 | 0.00018 |
| D | 0.00670 | 0.00015 | 0.00000 |
| E | 0.00045 | 0.05330 | 0.00002 |
| F | 0.00988 | 0.02937 | 0.00029 |
| G | 0.05330 | 0.00656 | 0.00035 |
| H | 0.02670 | 0.00008 | 0.00000 |
| I | 0.00015 | 0.05330 | 0.00001 |
| J | 0.00328 | 0.02670 | 0.00009 |
| K | 0.05330 | 0.01972 | 0.00105 |
| L | 0.02670 | 0.00023 | 0.00001 |
| M | 0.00491 | 0.21330 | 0.00105 |
| N | 0.10670 | 0.10670 | 0.01138 |
| O | 0.21330 | 0.02624 | 0.00560 |
| P | 0.10670 | 0.00030 | 0.00003 |

As can be seen, the above-detailed algorithm concludes that scenario N is the most likely: shopper A probably selected the sugar, and shopper B probably selected the Cheerios, the Fruit Loops, and the oatmeal.

Note that this conclusion was reached without use of any data tracking the path of either shopper through the store. Shopper purchase histories, item locations, and item removal time-stamps, alone, serve as the basis for selecting scenario N as the most likely.

Things naturally get more complex with more than two shoppers, and more than four items, but the application of the above principles to such other situations is straightforward. A reliable estimate of shopper-item selections can be achieved without tracking any shopper through the store.

(As in the earlier examples, these probabilities can be revised—and certain scenarios may be ruled-out, or made more/less probable—based on other information. For example, if shopper A reaches the customer service desk first, and weight data indicates the aggregate purchases of this shopper weigh less than five pounds, then shopper A cannot have the five-pound bag of sugar. The probabilities are re-computed—removing the scenarios in which shopper A picked the sugar. A next-most-likely scenario is then chosen as the most likely. Again, this has a ripple effect on the estimated tally of shopper B who is still in the aisles of the store.)

Figure 17:
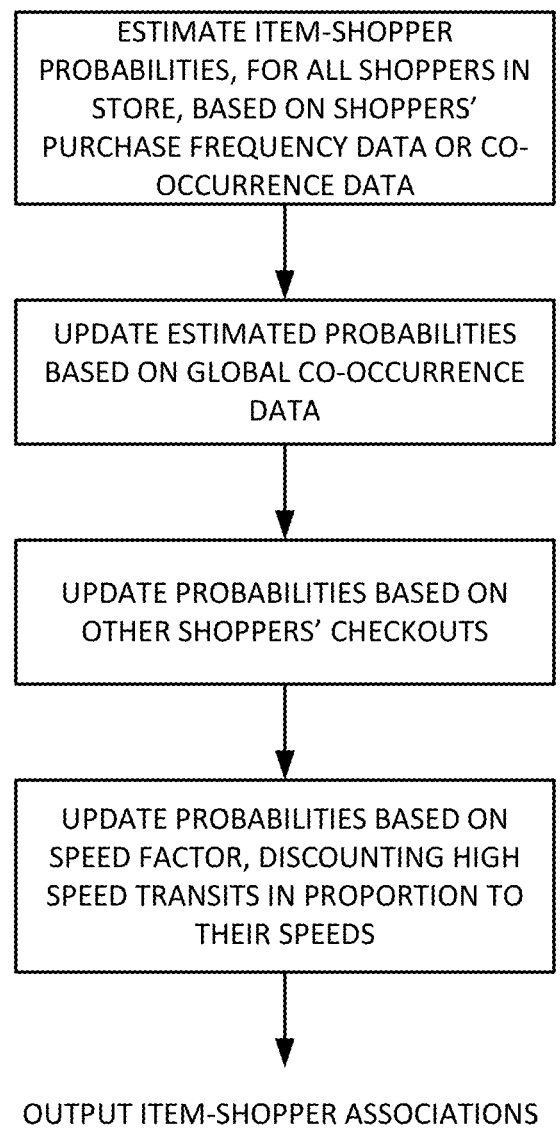
FIG. 17 is a flow chart illustrating certain aspects of one particular embodiment of the present technology.

FIG. 17 illustrates one particular embodiment, incorporating certain of the above-detailed aspects of the technology.

Figure 18:
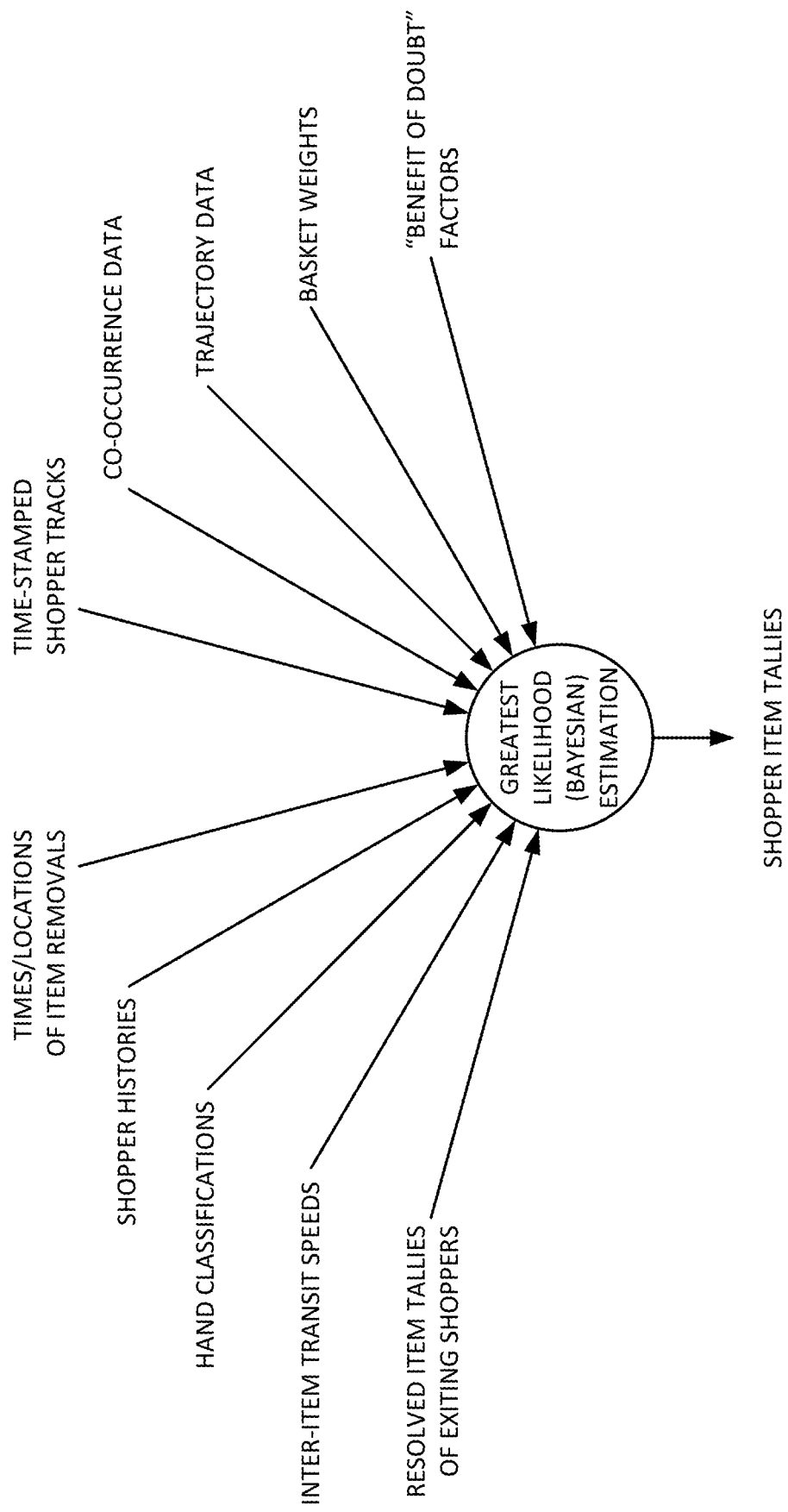
FIG. 18 illustrates factors that can be evaluated in assessing most-probable sets of item distributions, for shoppers in a store.

FIG. 18 details some of the factors that may be evaluated in determining how best to allocate a set of removed items among a group of shoppers, to generate a chargeable item tally for each. As noted, such evaluation can recur every few seconds, taking into account new data as it becomes available.

Exemplary Embodiments Employing Image and Audio Data Signaling Technologies Enabling Reliable Discernment of Shopper Intent and Purchase Decisions Grocery shoppers will select the channels that best meet their needs, finding inspiration in a variety of sources before going to grocery store. Capturing intent and providing a personalized shopping experience will increasingly dictate which channel and hence which retailer wins. Once in the store, shoppers expect the physical to resemble the digital—seamless access to product information, easy navigation, secure and frictionless check-out. The physical store has the additional benefit of transforming into a destination that can cement shopper loyalty by providing exceptional customer service, and opportunities for shoppers to learn and connect with knowledgeable store associates. It has an enduring competitive advantage over alternative channels with ready availability of inventory, indicating the significance of on-shelf and stock room inventory management.

There are five elements to ensuring success in unified commerce: Intent, Personalization, Mobile, seamless and secure. To successfully deploy such a system, it preferably is implemented with reliable and efficient identification technologies. This is in contrast with limited functionality of Mobile Only and Amazon Go. Both are focused on inferior technology, and do not provide guidance, reliability and efficiency for the shopper. The former scales on consumer devices with no support for traditional store information technology infrastructure, including checkout scanning and Point Of Sale (POS) systems, and the hardened devices carried by store associates, impeding customers service. The latter has shown that it cannot scale and is neither reliable nor secure. Our inventive embodiments configured as detailed in this document, address all five elements.

|  | Mobile Only | Amazon Go | Inventive embodiments |
|---|---|---|---|
| Intent | No | No | Yes (TV, radio, circulars, web, etc.) |
| Personalization | Yes | No | Yes |
| Mobile | Yes - device limitations | No | Yes + Industrial devices for in-store use by shoppers and store associates |
| Seamless | Mobile - In aisle only. | Yes - front of store only (probabilistic models) | Mobile & Front of Store (deterministic & with existing POS infrastructure) |
| Secure | Mobile Only | No. Shopper privacy is invaded due to constant surveillance. | Secure transaction on mobile and at front of store using Digimarc Barcode Payment Token Delivery. |

In preferred inventive embodiments, digital watermarking technology from Digimarc Corporation (e.g., marketed under the name Digimarc Barcode) is integrated into the POS hardware, operating systems and applications running at front of store, consumer and enterprise mobile devices (including wearable devices and robots (e.g., for shelf monitoring)) and leverages a cloud computing system, such as the Microsoft Azure platform, to orchestrate offer delivery and capture shopper intent and preferences.

Figure 20:
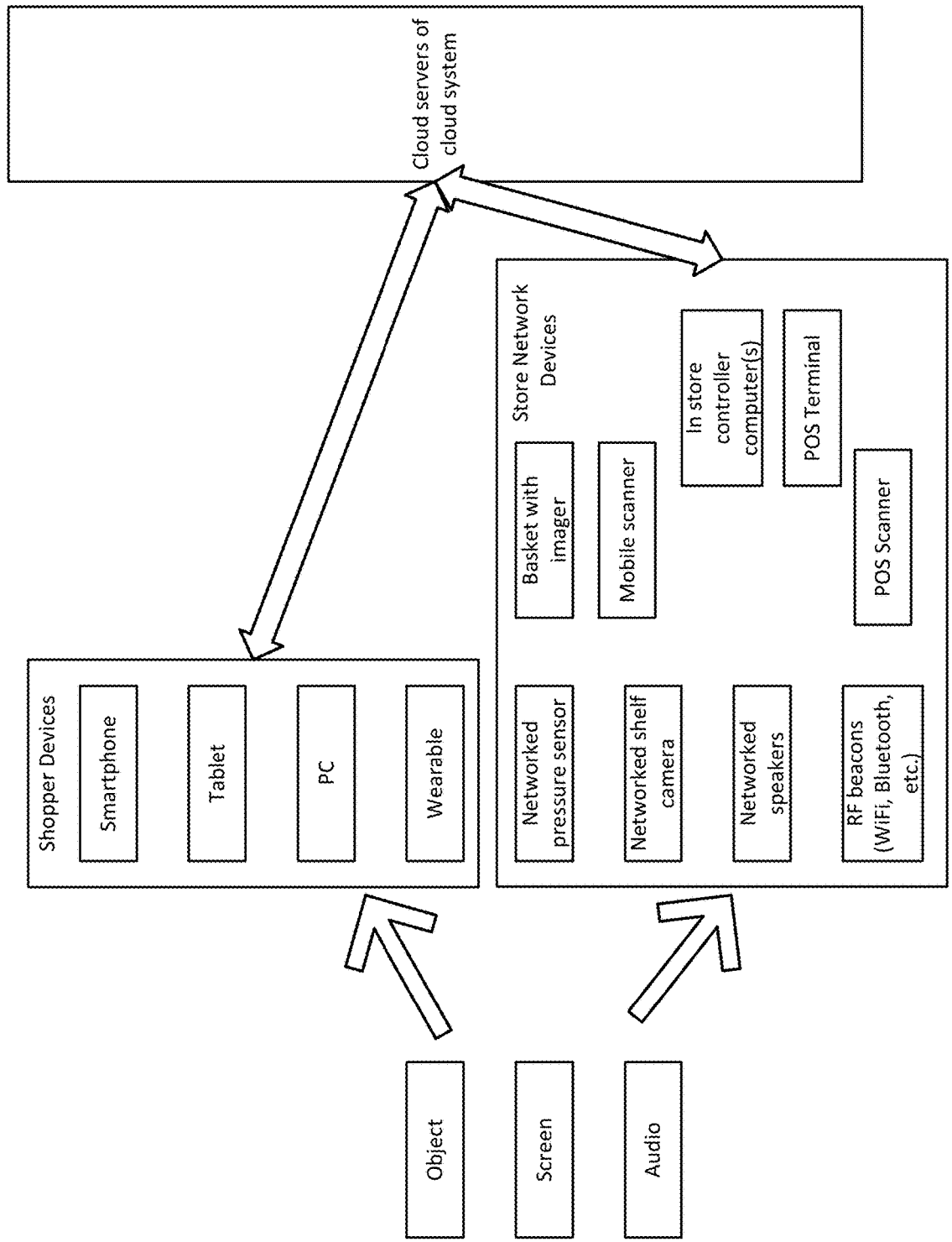
FIG. 20 is a system diagram illustrating the operating environment of devices enabled with digital watermark readers, both in devices managed by a retailer in the store and devices managed by the user in and out of the store facility.

To illustrate, we detail configurations of watermark technology spanning the shopper journey. FIG. 20 is a system diagram illustrating the operating environment of these configurations. The left side depicts signal sources from which image and audio sensor equipped devices discern product identification for product events. One signal source is an object representing the product itself or its package (including its label). The object is comprised of a machine-readable watermark signal imprinted in ink, marked via etching or engraving (e.g., laser marking), or pressed into its surface (e.g., to emboss the watermark signal in the surface topology). The screen is a display screen of a device, such as a TV, electronic shelf display, computer or mobile device (smartphone, tablet, wearable or the like). The watermark is conveyed in the image frame or frames rendered on the screen. The audio is embedded with a watermark signal and originates from a source device, such as speakers in a public place or home, digital display, appliance, TV, radio, etc.

The center portion of FIG. 20 divides the devices that capture signals from the signal sources into two categories: shopper devices at the top, and in-store devices at the bottom. Shopper devices include devices like smartphones, tablets, computers (various Personal Computer (PC) form factors), and wearables (like watches, fitness trackers, glasses or the like). These may also include multifunction devices like smart speakers (like Amazon Echo equipped with speakers, microphones and other sensors for receiving user input) and smart TVs, which integrate functions of smart speakers into the speaker, microphone and computer within a TV.

In store devices are also equipped with sensors to capture signals from the signal sources. These sensor equipped devices include shelf cameras, shelf monitoring robots, speakers, mobile product scanners, shopping baskets with imagers and scales (basket also includes a cart), fixed and handheld POS scanners, and the like. They also include devices used to assist in detecting product and shopper movement and location, such as RF beacons, pressure sensors, speakers, LED lighting systems, smart baskets. Additional devices include mobile scanners for in-store personnel and shoppers (for shopper product scanning and self-checkout), product scanning and weighing kiosks, product label printing, scales, POS scanners, and the like. Many of these devices are networked with the store computer network, which includes POS terminals, back office POS system, and various controller computers that manage in store speakers, LED lighting systems (with LED light signaling), camera systems, RF network (including Bluetooth and WiFi devices).

Applications running on both the shopper and in-store devices communicate with the cloud servers of the cloud system. In particular, the store provides a shopper application, with embodiments that run on shopper's devices (mobile application program) and in a web application (e.g., accessed via a browser). The shopper application operates both in store and outside the store to provide product discovery, purchase and consumption functions. This document describes the operation of the application over the product lifecycle, from product discovery, through purchase and product consumption.

"Home": Watermark Technology is Implemented in Home Devices to Perform Pre-Shopping Object Identification and Product List Generation.

Intent & Personalization: Within the home are numerous *circulars*, magazines, products and product packages. On in-home displays, such as TVs, personal computers, or the like are web pages, TV ads and a cooking show.

The shopper uses a mobile device, e.g., smartphone with camera, to scan the physical items using a Digimarc Mobile reader Software Development Kit (SDK) integrated into a mobile application program (the shopper application) executing on the mobile device. Shopping lists are created based on product engagement and prior shopping history, all tracked and delivered via a cloud server in a cloud service, such as Microsoft Azure. Azure Machine Learning Services create personalized suggestions and dynamically build a map for efficient pick at the store. This map identifies in-store locations of the products from these personalized suggestions and is built by indexing the extracted product identifier to product location in the store planogram. The map associates product location in the planogram to physical location coordinates within a selected store (selected by GPS coordinate location or by user input). A map generation service executing on the cloud service generates in-store route guidance based on products on the shopping list and within the product recommendation list. In a preferred embodiment, the shopping list is built from deterministic standard identifiers, such as GS1 identifiers, so the list is actionable at any point, allowing one to place and order for pick-up with no further steps or interaction. Product recommendations are generated using product event logs from more reliable shopper intent input derived from capture sessions.

Other sources of inspiration are provided via the TV advertisement and cooking show. These, more passive experiences, provide context to the cloud system on interest/ intent in a privacy preserving fashion, providing the mobile shopper application with product identification and in-store location of personalized offers or suggestions for the shopping list. Additional prompts may include schedule of community services at the grocery store, such as cooking classes, seminars on organic foods or how to address specific dietary requirements.

Figure 21:
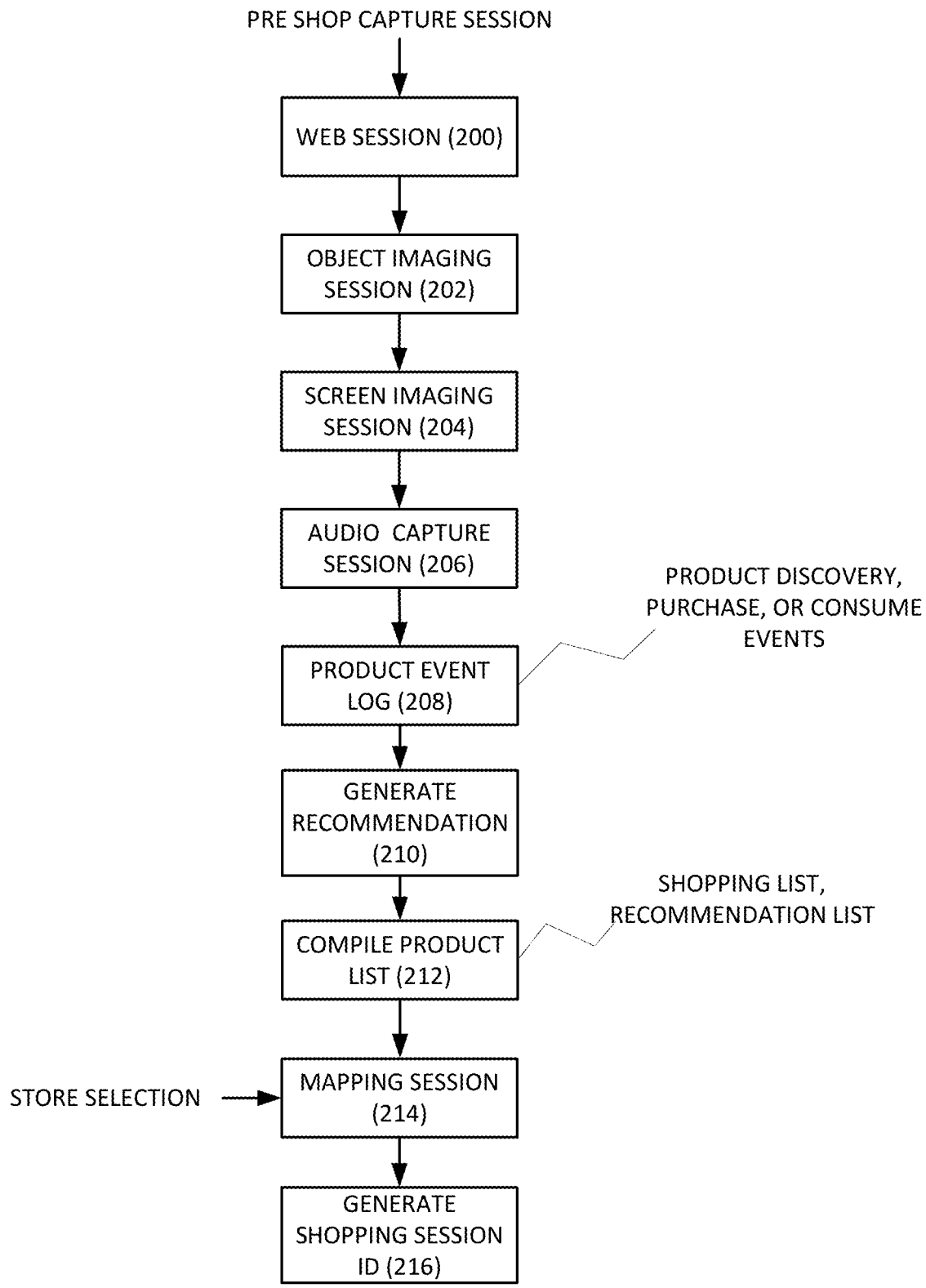
FIG. 21 is a flow diagram illustrating product event capture that fuels product list generation and in-store mapping.

FIG. 21 is a flow diagram illustrating product event capture that fuels product list generation and in-store mapping. In the web session 200, the shopper application is configured as a software program that captures product information from web pages that the shopper visits, such as Amazon's online shopping site. This capture of product identifiers is detailed in US Publication 20160063611, which is hereby incorporated by reference. For more on algorithms for capturing product information from a web page, see this publication.

In object imaging session 202, the shopper captures images from various sources to gather product identification for products of interest. This capture is performed with the mobile shopper application integrated with a digital watermark reader. These sources include the object of the product or its packaging (including label), printed items that promote the product, like a magazine page, circular, direct mail piece, shelf edge label, coupon, page in a book, such a recipe book, etc. Product identifying information is gathered from data encoded in the captured image, or from data linked to this identifying information in a database.

In screen imaging session 204, the shopper captures an image of a screen, which displays a product, product promotion, or image content related to a product (such as a product picture on a product web page). One example is the screen capture of a website, in which auxiliary watermark data is overlaid (e.g., via an alpha blend of a watermark image and web page image), such as described in US Publication 20160063611. Another example is screen capture of a video of a product on a TV or video product display. Embodiments of this type of extraction of watermark data from a display are described in U.S. Pat. No. 8,477,990, which is hereby incorporated by reference. Another example is screen capture of a higher capacity watermark signal, which is constructed from watermark payloads decoded from a sequence of frames, e.g., using erasure codes. For detailed embodiments of this form of capture, please see U.S. Pat. No. 9,311,640, which is incorporated by reference.

In audio capture, the shopper application, executing on shopper's device, captures audio which is encoded with data including or linking to product information. This delivery of product information embedded in audio is robust and spans many types of environments, including environments challenged with significant background noise. Examples include audio output from TVs or radios, product displays with speakers, audio beacons, speakers within public places, smart speakers (such as Amazon Echo or the like), chat bots, shelf talkers, audio output speakers of appliances of various kinds. Due to the flexibility and robustness of the technology, it can be used to convey product identifiers or links them in many audio distribution channels and audio formats. Web pages, email and online video may also include audio clips, which are encoded with data. The robustness of audio data encoding described in in U.S. Pat. No. 9,305,559 provides a reliable means of conveying product discovery events to the shopper application via its integrated audio watermark detector. The audio, after encoding with identifiers, may be subsequently compressed, mixed with noise, output from a speaker and re-captured via microphones, sensed from inline detectors of electronic audio signals in TVs, radios, sound cards, smart speakers, etc. Yet despite this distortion degrading audio quality, the embedded data encoded in the audio is detected reliably by detectors operating on microphone captured audio signals in devices of various form factors. A lower power mobile device detector implementation is described in US Publication 20160378427, and is preferably integrated into the mobile shopper application for product discovery, purchase and consumption information anywhere in the shopper's journey. This lower power mode enables the shopper to leave the application in "always on" listening mode (e.g., in pocket or basket cradle), without undue draining of a mobile device battery. These attributes are particularly advantageous for wearable devices as well as in-store shopping devices, like baskets and mobile readers. The versatility of the technology extends to live events, concerts, public spaces like malls and restaurants. U.S. Pat. No. 9,454,789 details embodiments of low latency encoding data in audio produced at live events and detected in audio hosted in online hosting services and social media sites. These embodiments provide means for viral distribution of audio content that is captured, posted, hosted, and shared virally within social media channels.

The shopper application, operating in conjunction with the cloud system, captures all of these product discovery events from the sessions (200, 204, 206) in a product event log. In one variant, the cloud system administers a master log of product discovery events captured by a shopper and associates them with the shopper's account established for the application. This variant enables the shopper and related family to add product discovery events, which include standard product identifier and links to product descriptions. This variant enables the shopper to contribute product discovery events from various devices and shopper application instances, whether they are used for web product discovery, audio capture, or object capture. These include mobile shopper applications running on family mobile devices, browser applications (such as the browser extension used in digital showrooming of US Publication 20160063611) running on home computers, application programs of smart speakers within the home (e.g., implemented as a skill for Amazon Echo), smart TV applications, set top box applications, and Application Programming Interface program libraries of operating systems in devices of various kinds including vehicles, wearables and home appliances. These are all enabled by, for example, by implementations of a detector SDK, for integration into application programs on devices of various kinds.

In another variant, the shopper may opt to keep product discovery events private or anonymous. In one privacy mode of the shopper application, standard product identifiers are stored locally on the shopper mobile device in memory allocated to the mobile shopper application and not shared with the cloud system. In another mode, the product discovery events are anonymized before being shared with the cloud system, which analyzes them and provides product recommendation based on them with its machine learning services.

In a similar fashion to the above product discovery event capture, product purchase events are captured in the shopper application when the shopper acquires product items within a store. Embodiments of object acquisition within a store are detailed throughout this document and not reiterated again here. However, these purchase event logs can, at the shopper's option, be added to the product event log 208. This facilitates shopping list creation, product re-order, and importantly, adds reliable product preference data to the machine learning system of the cloud service, which provides product recommendations.

In block 210, the shopper application invokes the cloud service to provide these product recommendations, based on the product events the shopper is willing to share. This product recommendation is implemented by invoking the machine learning service of the cloud service (e.g., Azure Machine Learning, Amazon AWS, or the like).

The shopper application then compiles a list of products, as selected by the user from prior purchase logs and the recommendations in block 212. One approach is to provide a product list with User Interface controls to scroll and select, delete and add products based on product descriptions linked to standard product identifiers.

Once complete, the shopper application invokes a mapping session in block 214. The user may select the store manually or the application can recommend local stores based on the location of the shopper's mobile device and/or inventory checking for availability based on the product identifiers in the inventory management system implemented for the retailer in the cloud system. The mapping session retrieves planogram data mapping products to locations within a selected, nearby store.

The shopper application may also generate a shopping session identifier. This identifier may be invoked by the shopper application and provided to the cloud service upon proximity detection of entry at the selected store (see above regarding detecting proximity/entry of the shopper at a store). This enables the cloud service to manage the shopping session using the shopping list previously generated.

Figure 22:
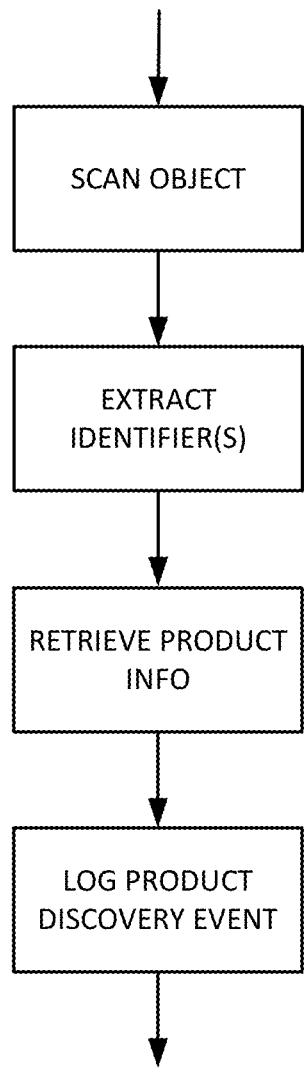
FIG. 22 is a flow diagram illustrating an embodiment of the object imaging session of FIG. 21.

FIG. 22 is a flow diagram illustrating an embodiment of the object imaging session (202) of FIG. 21. In this embodiment, the shopper invokes a camera function of the mobile shopper application. With this camera function, the application takes control of the mobile device camera and captures frames of images. The Digimarc mobile SDK extracts a standard identifier from a frame and uses the identifier to fetch associated product information. This information, along with other context information, such as location and time of scan, and links to scans within a time and location distance, and/or product category are logged in the application memory as a product discovery event. The shopper application may opt to share the product discovery event with the cloud service for training and machine learning based recommendation, as previously described. The Digimarc mobile SDK forms part of the Digimarc Barcode technology from Digimarc Corporation. Detailed embodiments of this technology are provided in Digimarc patent documents incorporated in this document, and indicated below as providing examples of Digimarc Barcode technology, e.g., for encoding and decoding data in spot colors, spot color substitution, sparse signals, luminance and chrominance modulation, etc. Image signals modulated with auxiliary data may be applied to objects via laser marking, printing of ink, engraving, or embossing, as noted herein. These marking means are compatible with Digimarc mobile detection technology.

Figure 23:
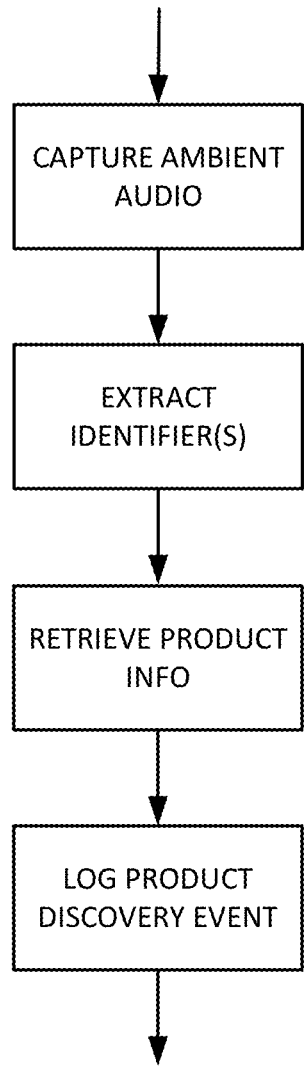
FIG. 23 is a flow diagram illustrating an embodiment of the audio capture session of FIG. 21.

FIG. 23 is a flow diagram illustrating an embodiment of the audio capture session (206) of FIG. 21. In this embodiment, the shopper invokes a listening function of the mobile shopper application. This may operate in a low power, always on mode and may be configured to turn and off automatically based on sensing that the shopper device is within parameters set by the user to authorize listening of ambient audio through the device microphone. With this listening function, the application obtains an audio signal from the audio captured through the microphone of the mobile device and buffers frames of audio. Please see U.S. Pat. No. 9,305,559 and low power audio detector of US Publication 20160378427, which are hereby incorporated by reference. The Digimarc mobile SDK extracts a standard identifier or index to same from buffered audio frames and uses the identifier to fetch associated product information. This information, along with other context information, such as location and time of scan, and links to scans within a time and location distance, and/or product category are logged in the application memory as a product discovery event. The shopper application may opt to share the product discovery event with the cloud service for training and machine learning based recommendation, as previously described.

Figure 24:
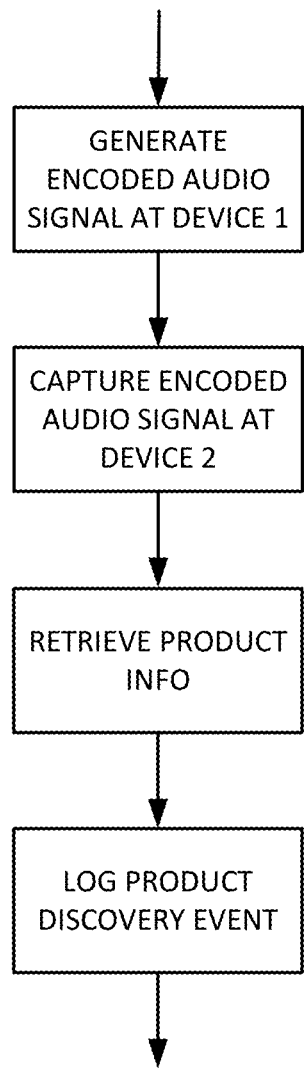
FIG. 24 is a flow diagram illustrating another embodiment of the audio capture session of FIG. 21.

FIG. 24 is a flow diagram illustrating another embodiment of the audio capture session (206) of FIG. 21. In this embodiment, the shopper invokes the listening function of the mobile shopper application as in FIG. 23. Here, a first device generates audio encoded with an identifier, and a second device captures this audio and decodes the identifier. The second device looks up product information using the identifier, or supplies the identifier to the cloud system, which does the same. The shopper application logs the product discovery event, according to the privacy and anonymity controls set by the shopper. This approach is useful for transferring product information between a first device, where first product discovery activity is executed, and then an identifier for the product discovery event is communicated to the second device. One example where a web session 200 is executed on a first device, and then communicated to a second device, such as the shopper's mobile device, executing the shopper application. This is a way to convey product discovery privately and securely between the first and second devices. The audio signaling technology described in connection with FIG. 23 may be used for device to device communication. High capacity audio signaling (e.g., at frequencies not readily audible to users, 18 kHz to 22 kHz, yet within audible range of mobile device microphones) of U.S. Pat. No. 9,305,559 may be used to transfer product discovery event and its context information.

Figure 25:
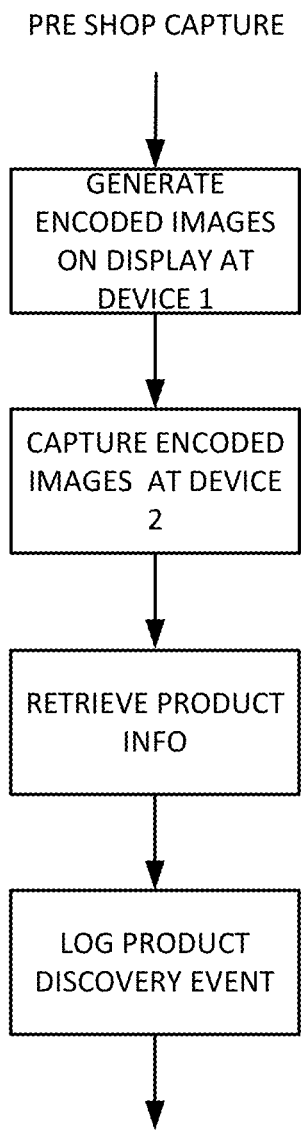
FIG. 25 is a flow diagram illustrating an embodiment of the screen imaging session of FIG. 21.

FIG. 25 is a flow diagram illustrating an embodiment of the screen imaging session (204) of FIG. 21. In this embodiment, the mobile shopper application invokes its camera function to capture an image with encoded data from a screen. Embodiments for encoding data in displayed images, and for extracting that encoded data are described above in connection with session 204 above, and cited patent documents incorporated in the description of FIG. 21. Product information is retrieved by first extracting a data payload from captured image frames of the screen, and then obtaining a standard product identifier from that payload or in a database indexed by a data string in the payload. The shopper application then logs the product discovery event.

Having outlined several embodiments of product discovery events, we now resume the description of the shopper's journey depicting the operation of this technology.

"On-The-Go": Walk into the mall

As the shopper enters the mall, she encounters a Digital Display that is promoting new offerings in the prepared foods section of the store (at the end of the mall). Featured are fresh apple pies (supplies limited) & organic smoothies. The shopper decides to reserve a pie for pick-up later that day and downloads the ingredient list for the smoothie (ingredients from across the store will also be assembled and waiting for you when you pick-up the apple pie if you like). This is enabled by screen and/or audio capture from the screen or audio output of the Digital Display.

While waiting to get coffee at the coffee cart, an advertisement plays over the audio at the coffee store, inviting the shopper to attend a session by local coffee roaster on the geography of coffee that will happen later that day at the grocery store. The shopper's mobile device, having heard the audio and knowing her intent to go to the store, ads it as a reminder on in the event calendar within the mobile application. This is enabled by the above described audio capture session.

"Entering Store": Enter the grocery store at the end of the mall

As the shopper enters the store, the shopper's mobile application is automatically placed into "shopping mode" via audio watermarks or other geo-fencing technologies, displaying the list, a store map (with navigation overlaid) and reminders. For examples of implementations, see US Publication 20150168538 and U.S. Pat. No. 9,629,118, which are hereby incorporated by reference. The store manager welcomes the shopper in with a personalized response (again informed by the shopper list, loyalty information—all modeled in Azure, Amazon AWS or like cloud service). The above described embodiments of privacy enhancing self checkout enablement may be employed within the store, with the use of scanning of deterministic codes from products and the environment (shelf edge labels, in store audio, product promotions, retail ready product containers, and the like) to provide reliable and efficient product identification and more accurate input of product discovery events, based on this product identification.

The shopper's location, with high accuracy is placed on the map via audio, LED lighting, or pressure sensitive tiles.

"Store Perimeter": Walk over to the prepared foods area.

Waiting for the shopper are the ingredients for the smoothie and Apple Pie. The shopper scans these product packages with the mobile shopper application, which, running the Digimarc mobile reader SDK, extracts GS1 product identifiers conveyed in digital watermarks on the packages or labels. A running tally starts in the mobile shopper application. A label encoded with a digital watermark (e.g., Digimarc Barcode for Thermal Labels from Digimarc Corporation) is placed on each which includes the shopper's name, in case the shopper decided to check out at front of store. While waiting, the shopper notices a Smartphone special on some soon-to-expire bakery items, and make the purchase [in aisle or at front of store].

Next to the pick-up location is the Quick Serve Restaurant providing healthy choices. The shopper completes her order on the mobile application running on her phone, building an animation of her sandwich as she does so. To order, the shopper shows the animation to the camera at self-service kiosk (Surface device) facing the shopper. Digimarc Barcode for QSR is utilized to securely transmit the data inside the animation, and the shopper is notified when the ordered item is ready. For implementation details of conveying data from animation on the screen to another camera-enabled device, see U.S. Pat. No. 9,311,640, which is hereby incorporated by reference.

The shopper also happens to see the setup where the coffee roasting presentation will happen later that day. Audio promoting it is already playing and the mobile application offers to pull download (for later viewing) a video prepared by the speaker on environmental implications of using paper or metal coffee filters. The mobile application extracts an identifier encoded in the audio and issues it to the Digimarc resolver service, which provides a network link to the video file for download from the cloud system. Examples of technology for encoding data in the audio are described in U.S. Pat. No. 9,305,559 and compatible technology for decoding the data from the audio in a lower power mobile device implementation is describe in US Publication 20160378427. This is yet another example enabled by the audio capture session described above.

"Center of Store":

The mobile application navigates (via audio signal positioning, LED lighting, waypoint reckoning, or the like) to the first item on the shopper's list. The shopper picks up the ingredient information (where curious about GMO's). The mobile application reads a digital watermark embedded in the package, extracts the GS1 identifier, and using it, looks up product information. Product information, such as product information provided according to the SMARTLABEL™ initiative of the Grocery Manufacturers Association, is displayed. Liking what she has read, she drops it into the basket.

In one embodiment, the mobile application displays an image of the item from the shopping list on the mobile device display. This assists the shopper in selecting the correct item by enabling her to make a visual comparison between the displayed packaging and the packaging of the item on the shelf. Additionally, after the shopper images the item on the shelf, the application extracts its identifier and cross checks the imaged item with the item on the list to confirm that the shopper is going to select the correct item. This feature also enables the shopper to confirm that she wishes to select a different item than the one on the shopping list.

This method of assisting product selection is implemented with an augmented reality display. First, the mapping feature of the application directs the user to the shelf location where a product on the shopper's list is located based on planogram data for the store. At that location, the shopper pans the camera over items on the shelf, capturing images of them and presenting these images in an augmented reality display on the screen of the shopper's mobile device. The display is augmented with highlighting of image locations where a product identifier is extracted (e.g., e.g., a dot or like indicator is superimposed over the image location from which a valid product identifier has been extracted). The application highlights a product with a product identifier matching a product identifier on the shopper's list in a different color (e.g., green dot) to identify the product in the display for the shopper to find more easily. The dot graphics are selected to retrieve additional product information, such as the product image, metadata, and correlation with the shopper's list or purchase history. For background on implementing augmented reality displays using digital watermarking or image fingerprinting, please see U.S. Pat. Nos. 8,565,815, 7,991,157, 9,648,197, 9,818,150, and US Patent Application Publication US20170249491, which are hereby incorporated by reference.

As the shopper finds the second item on her list, she notices that all the shelf-labels are clean and devoid of distracting text and barcodes. This is enabled using Digimarc Barcode technology, such as sparse data encoding and decoding technology described in and US Publication 20170024840, which is hereby incorporate by reference. The product next to the one she selected (which happens to be an in-store brand equivalent), has special offer available. She scans the shelf-label and coupon is credited to her tally. The Digimarc SDK in the mobile application extracts an identifier from a digital watermark embedded in the shelf-label and fetches the coupon from a database indexed by the identifier.

She also happen to notice a robot from Fellow Robots that leverages the Azure backend with image recognition and Digimarc Barcode technology to ensure the shelves are always stocked with her favorite items. Nearby is a Zebra device running Windows 10 (with native Digimarc Barcode support) for store associates.

"Front of Store":Walking to exit

On the way to the front of the store, the shopper passes a refrigerated case with organic juices (in plastic bottles). She grabs one to enjoy on the way out. The refrigerated case is automated with cameras that read Digimarc Barcode and can sense depth (e.g., Kinnect Camera). When she picks up the bottle, it automatically prompts her. This enabled by object capture session implemented either within cloud service, in-store computer connected to the network cameras near the case, or the shopper mobile application.

When the shopper has decided to complete her transaction and leave the store, she selects the "done" button on the mobile application (which appears when location tracking technology it employs detects that the shopper is near the store exit) or indicate "buy" via voice.

The shopper may alternatively check out using a Point of Sale (POS) terminal, e.g., executing Retalix POS software, which runs on Windows 10 (which has native Digimarc Barcode support) and is connected to a Datalogic 9800 scanner or like POS scanner.

The cashier scans all the items quickly (Apple pie has a damaged barcode) and also points out that the items for your smoothie will remain fresh for another 3 days (prompted based on Expanded Fresh payload which provides expiration data data). Payment concludes with the shopper selecting their payment card of choice and showing it to the barcode scanner, which also displays the coupons that have been scanned from shelf edge labels in the store. For implementation details of conveying electronic payment data from a mobile device display to another camera-enabled device (e.g., the barcode scanner), see U.S. Pat. No. 9,311,640, which is hereby incorporated by reference.

"In Mall":Walking to exit of mall

After leaving the store, the shopper is parched after a hard day of shopping. She drinks the orange juice and disposes of it in a nearby recycling bin. The bin is intelligent; not only does it sort the plastic, but will credit you your bottle deposit back to your store account by prompting your mobile app to display the screen to a camera on top of the bin.

Figure 26:
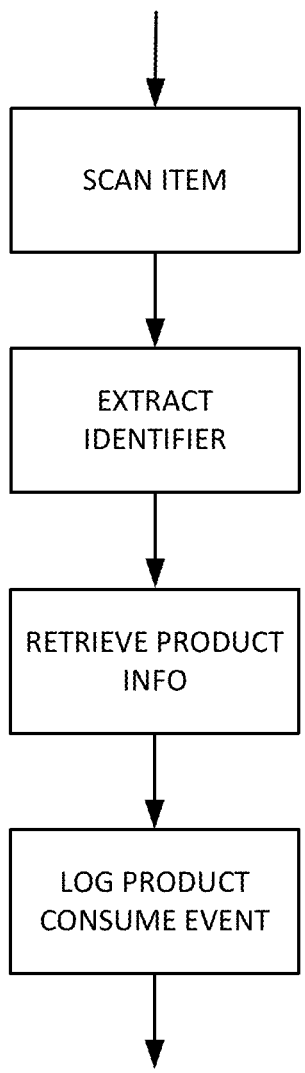
FIG. 26 is a flow diagram illustrating an embodiment of collecting product consume event data after purchase.

FIG. 26 is a flow diagram illustrating an embodiment of collecting product consume event data after purchase. The enabling technology is the same as described for FIG. 22, yet the nature of the event captured is not product discovery, but a product consumer event. Such an event is captured in the context where the shopper is using the product (e.g., fetching instructions for use or consumption indexed to the product by the product identifier), is added to the product to a re-order list, or is disposing of the product. In the latter case, the reading device provides product information for recycling, which is used to control sorting for recycling. These functions complete the circle back to product discovery and shopping list generation in the shopper journey. Serialized identifiers enable the cloud system to gather information about the life cycle of the product, including where and when it was purchased, how it was used, and when it was disposed of. All of this object scan information provides valuable information in predicting the need for product re-ordering and refining product recommendation.

Concluding Remarks

We have become acclimated to a lack of privacy in our electronic lives, because that's the way it's been. But conversely, we've become acclimated to having privacy in our physical lives because—again, that's the way it's been. Various embodiments offer opportunities to keep our physical actions in brick and mortar stores relatively private—away from the hoovering data silos that note and perpetually remember every action of our lives online. Shoppers may opt in to a desired level of sharing of product events to get product recommendations with associated discounts.

Particularly important to some individuals is avoiding biometric identification. While embodiments of the present technology can be implemented so as to employ biometric features, such reliance is not required.

Thus, in accordance with certain embodiments of the present technology, the identity of a shopper is not known unless and until the shopper presents an identity-traceable electronic payment credential in settlement of the accumulated tally. (This may be called "late-binding" or "checkout-binding" of personally-identifiable information, with the tally of items finally selected for purchase.) Many transactions may be totally privacy-preserving.

Having described and illustrated principles of the present technology with reference to illustrative embodiments, it will be recognized that the technology is not so-limited.

For example, the detailed embodiments are kept mathematically simple, in order to facilitate understanding. In practical application, more complex mathematical formulas can be used, e.g., in combining or weighting different factors in reaching decisions. For instance, instead of being based on linear equations, more suitable embodiments may be based on non-linear equations. (E.g., the just-discussed credibility score may be based on a function involving the square-of-the-distance between items.) Similarly, more sophisticated optimization techniques may be employed, e.g., employing dynamic programming, convolutional encoding of item identifiers—with corresponding maximum-likelihood decoding (e.g., based on trellises), etc. A great number of such implementations will be apparent to the artisan, based on the foregoing description.

While certain of the embodiments were described as functioning without using certain equipment (e.g., a shopper mobile device) or certain data (e.g., information about a shopper's location track through the store, or purchase history), it will be recognized that such omitted element/information can be included—often with added benefits (e.g., increasing the confidence of certain item-shopper assignments).

Likewise, although shoppers in an illustrative embodiment are anonymous, this is not required. In other embodiments, personally-identifiable information about shoppers may be revealed to the store—upon the shopper's entrance to the store, or later. (By personally identifiable information, applicant means to refer to data, such as a credit card number, that the store can employ to learn the name of the shopper.)

Sometimes shoppers select an item for purchase, and later change their mind. If a shopper returns an item to its correct shelf location, the technologies used to identify its removal can likewise be used to identify its replacement, in which case the item is automatically removed from the tally estimated by the system. Alternatively, the shopper can leave the item at the customer service desk at the front of the store, where store personnel can remove the item from that shopper's tally.

While the specification makes repeated reference to trellis diagrams, and traversing them to identify paths that yield the highest figures of merits, it will be understood that, in implementing the present technology, there is no physical diagram. Rather, the principles of the trellis diagrams are implemented in software, and this software enables what may be regarded as virtual traverses of different paths, to assess which set of item/shopper assignments are most likely.

In some instances, devices are referenced without reference to a communication channel by which data is communicated from such devices (e.g., cameras in shoppers' baskets). The artisan will understand that such interfaces are straightforward and conventional, e.g., employing wireless signaling such as WiFi or Zigbee. Likewise, other mundane details of implementation are sometimes omitted where same would be routine for the artisan.

Depth sensing cameras take a variety of forms, e.g., infrared, laser, time of flight, stereo, etc. One popular depth sensing camera is marketed by Intel under the RealSense brand, and projects an infrared pattern of dots in a viewing space, which are sensed by an infrared camera. The detected spatial arrangement of the dots reveals the 3D shape of the surfaces on which the pattern is projected.

Some embodiments employing cameras can employ face detection (as opposed to face recognition) routines, to identify image patches that likely correspond to faces. These pixel areas can then be immediately blurred so that no face can be recognized therefrom.

If an implementation makes use of shopper smartphones, the arrangement may be regarded as two state-machines. One is at the store level, and the other is at the smartphone level. The binding and disambiguation of their respective states is what completes the purchase.

Such a distributed system has the usual issues of trust involving shared state data. One approach to this is a block-chain, in which all components of the ecosystem use a shared ledger that tracks movements of mobile devices and movement of items off shelves. As each event is written in the block-chain, it becomes increasingly difficult to spoof a transaction or a location. A separate block-chain can be managed for the transaction, with the bock finally being submitted at the point of completing the transaction. In some embodiments, the shopper's ID (anonymous or not) can reference such a block-chain, providing a trusted record of previous activities in the store relating to the shopper.

Desirably, the sensor data used by the store computer to estimate item-shopper associations, is not maintained. Such data is preserved only so long as the shopper is in the store, or if there is an issue with recognition. After the shopper leaves, or the issue is resolved, such data is discarded in cases where the shopper has not opted to retain it. Again, this aids in privacy preservation.

Some of the features detailed herein are characterized by terms such as "desirably," "typically," "commonly," or "preferably." It should be understood that each such specified arrangement is the usual case—and often is applicant's preference, but is not a requirement of the technology. Implementation in a contrary fashion is possible, and indeed is expressly contemplated by this specification. (Likewise with expressions such as "may" or "can." The feature so-characterized can be included, or in other embodiments can be omitted.)

References were made to store planograms. As is familiar to artisans, a planogram is a specification, e.g., in computer readable form (such as a database), identifying which item should occupy which shelf space. It essentially defines the locations of all items in the store.

While detection and identification of an item removed from a shelf was described with reference to imagery from a camera, it will be recognized that imagery from plural cameras can alternately be used. Such an arrangement is disclosed in U.S. Pat. No. 9,262,681.

The different processes detailed herein can be performed by hardware at various different locations, e.g., in a basket or tote, in a rack of shelving, in a shopper's smartphone, in a point of sale terminal, in a central store computer, and/or in a "cloud" computer.

The methods and algorithms detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of the above-detailed processes on a microprocessor—such as the process of computing SIFT features, or performing hand classification with a neural network—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the noted Arduino chip, and the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform hand classification, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

A particular implementation of any of the above-detailed processes, e.g., for computing SIFT features or performing hand classification, using an ASIC again begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of the above-detailed processes on an FPGA begins by describing the process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations associated with some or all of: SIFT point feature extraction, convolution for neural network operations, etc. However, such native instruction set would lack certain of the instructions available in more general purpose microprocessors.

These just-noted different forms of hardware implementations are further detailed in applicant's U.S. Pat. No. 9,819,950, the disclosure of which is incorporated herein by reference.

Figure 19:
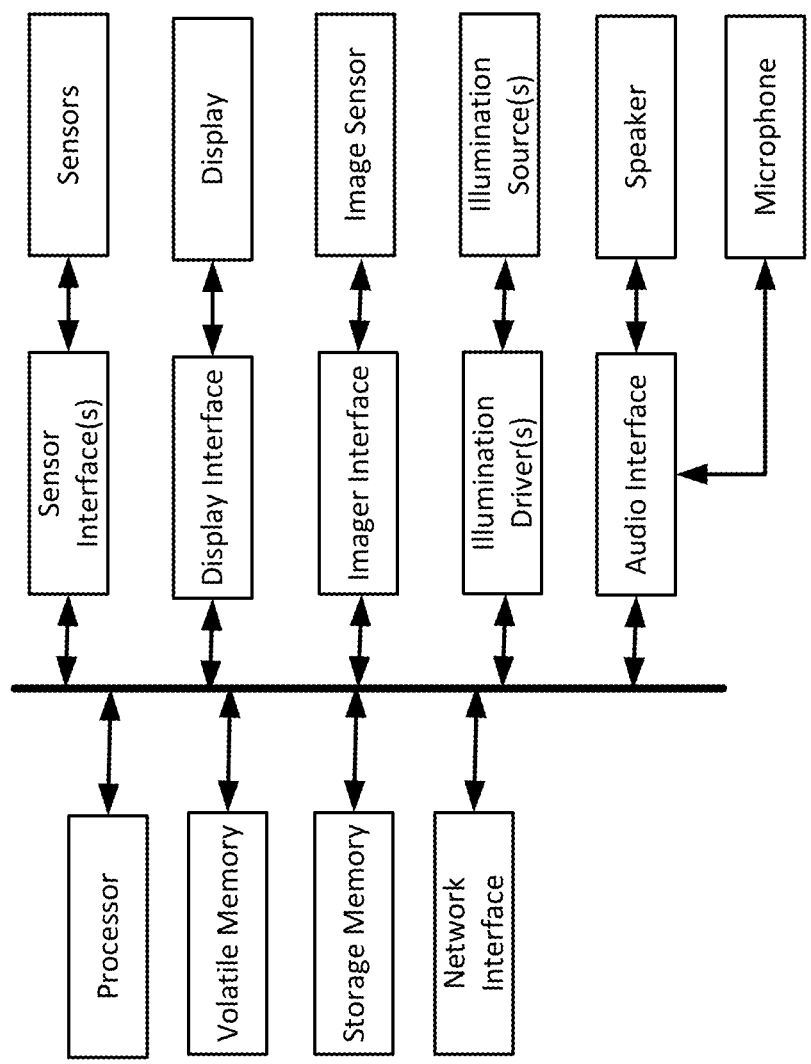
FIG. 19 is a block diagram of an illustrative computer that can be configured to perform functions detailed in this specification.

FIG. 19 depicts one illustrative hardware arrangement.

Software instructions for implementing the detailed functionality can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user. Some or all of the functionality detailed in this specification can be implemented in operating system software, application software and/or as embedded system software.

Different of the functionality can be implemented on different devices. For example, in a system in which a camera captures imagery of a product being withdrawn from a shelf, a processor module (e.g., the Arduino module referenced earlier) can perform certain of the processing (e.g., detecting motion in the captured imagery, and determining whether a hand is depicted), and a remote server can perform other of the processing (e.g., classifying any earlier-sensed hand, as to its type). Thus, it should be understood that description of an operation as being performed by a particular device is not limiting but exemplary; performance of the operation by another device, or shared between devices, is also expressly contemplated.

In like fashion, description of data being stored on a particular device is also exemplary; data can be stored anywhere: local device, remote device, in the cloud, distributed, etc. (To illustrate, while the item removal log of FIG. 9, and the shopper track data of FIG. 10, are described as being maintained in different data structures, in other implementations such data can be consolidated into a single data structure.)

Details concerning watermarking are known from applicant's previous patent filings, including patent documents 8,401,224, 6,975,744, 6,973,197, 6,912,295, 6,590,996, 6,345,104, 6,307,949, 6,122,403, 20100150434, 20120046071, 20120078989, 20140029809, 20140108020, 20140119593, 20150016664, 20160275639 and 20160217547, and 20170024840. Such watermarks are most commonly imperceptible, meaning they are not noticeable to a viewer examining watermarked packaging from a typical viewing distance (e.g., 20 inches) in typical retail lighting (e.g., 50-85 foot-candles), who has not been alerted previously to the existence of such encoding. Spot colors, as are sometimes found on packaging, can be watermarked by leaving tiny voids in the printing to subtly change the luminance or chrominance. Other techniques for watermarking of spot colors are detailed in patent documents 6,763,124, 9,449,357, 20160198064, and WO 2016/025631. Embodiments of these methods of encoding data in and decoding data from image and audio are available from Digimarc Corporation, marketed under the name Digimarc Barcode. These provide supporting embodiments for, e.g., the object scanning function of FIG. 22.

Some of applicant's other work relating to the present technology is detailed in patent documents 9,451,406, 7,340, 076, 20140357312, 20140244514, 20140164124, 20120214515, 20120208592, 20020114491, 20150168538, 20140052555, 20160044460, 20160364623 and pending application Ser. No. 15/152,365, filed May 11, 2016 (Now U.S. Pat. No. 10,007,964), and Ser. No. 15/830,874, filed Dec. 4, 2017 (Now U.S. Pat. No. 10,552,933).

A great deal more information about neural network techniques that can be used in embodiments of the present technology, is provided in copending application 15/726, 290, filed Oct. 5, 2017 (Now U.S. Pat. No. 10,664,722).

Electronic shelf labels are detailed, e.g., in applicant's patent application 20140052555, and in patent documents 7,005,962, 7,213,751, 7,461,782, 20040012485 and 20060100967 assigned to the Swedish company Pricer AB.

As an alternative to watermarking, fingerprint-based content identification techniques are also well known. SIFT, SURF, ORB and CONGAS are some of the most popular algorithms. (SIFT, SURF and ORB are each implemented in the popular OpenCV software library, e.g., version 3.3.) Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

Optical character recognition (OCR) can be similarly employed to identify objects, and can also be used in embodiments of the present technology.

Blob tracking is a well-developed discipline in image processing. See, e.g., Isard, et al, A Bayesian multiple-blob tracker, Proc. $8^{th}$ IEEE Int'l Conf. on Computer Vision (ICCV), 2001, Vol. 2, pp. 34-41, Zhao, et al, Tracking multiple humans in crowded environment, Proc. 2004 IEEE Conf. on Computer Vision and Pattern Recognition (CVPR), 2004, and Gabriel, et al, The state of the art in multiple object tracking under occlusion in video sequences, in Advanced Concepts for Intelligent Vision Systems, 2003, pp. 166-173, for exemplary implementations.

This specification has discussed several different embodiments. It should be understood that the methods, factors, elements and concepts detailed in connection with one embodiment can be combined with the methods, factors, elements and concepts detailed in connection with other embodiments. While some such arrangements have been particularly described, many have not—due to the large number of permutations and combinations.

Applicant similarly recognizes and intends that the methods, elements and concepts of this specification can be combined, substituted and interchanged—not just among and between themselves, but also with those known from the cited prior art. For example, although not expressly stated, the artisan should understand that applicant is teaching an implementation of a hand-classifying neural network that can employ an input layer to which imagery is provided, and a plurality of intermediate "hidden" layers—each being associated with a max-pooling layer, ultimately followed by one or more fully-connected output layers, since such architecture is detailed in the appended documents. Moreover, disambiguation of a shopper's tally can be aided by sensing the temperature of items in the shopper's basket—to indicate whether an item of frozen food is included, since same is taught in incorporated-by-reference document 20160063821. It would violate the Patent Act's requirement that this specification be "concise" if applicant were to belabor this document with individual recitation of each such specific combination of elements. However, all such combinations are expressly intended by applicant, and should be understood as being disclosed by this specification. Implementation of such combinations is straightforward to the artisan from the teachings provided in this disclosure.

While this disclosure has detailed particular orderings of acts and particular combinations of elements, it will be recognized that other contemplated methods may re-order acts (possibly omitting some and adding others), and other contemplated combinations may omit some elements and add others, etc.

For example, in identifying items removed from shelves, the foregoing specification described deriving SIFT points from imagery using a shelf-mounted Arduino processor, and then relaying the SIFT points from the Arduino processor to the central computer for database matching to a particular product GTIN. Of course, these acts may be performed differently. For example, the Arduino processor could also match the SIFT points against a database of products on the shelf, and could then relay resulting GTIN data to the store computer. Or the camera data could be relayed to the central computer, which could derive the SIFT points and perform the database matching. The artisan will recognize multiple such instances in which the detailed acts are performed by different actors, or in different orders, without departing from the scope of the present technology.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

The invention claimed is:

1. A signal processing method executed on a device with a programmed processor, the method comprising:
   capturing images of objects;
   from the images of the objects, extracting product identifiers of the objects from auxiliary data modulated into the objects;
   retrieving product information associated with the product identifiers;
   logging product discovery events for products identified in the product information;
   generating a product list from the product discovery events;

detecting that a user has entered a store, and in response, initiating a shopping session for items in the product list;
capturing images of product items in the store;
from the images of the product items, extracting identifiers from auxiliary data modulated into the product items;
based on a comparison of an identifier extracted from an image captured in the store and an identifier of a first product on the product list, displaying an indicator that a product depicted in the image captured in the store corresponds to the first product on the product list;
displaying an augmented reality display in which the indicator is superimposed on a displayed image of the first product captured by the shopper in the store, the displaying comprising superimposing the indicator at a location in an image frame where the identifier is extracted from a digital watermark; and
adding the product items to a tally of the user.

2. The method of claim 1 further comprising:
capturing a screen image of a display screen via a camera;
extracting a first product identifier from the screen image;
logging a product discovery event for a product associated with the first product identifier.

3. The method of claim 1 further comprising:
capturing audio with a microphone;
extracting a first product identifier from the audio;
logging a product discovery event for a product associated with the first product identifier.

4. The method of claim 1 further comprising;
capturing a screen image of a display screen via a camera;
extracting a first product identifier from the screen image;
capturing audio with a microphone;
extracting a second product identifier from the audio image;
logging first and second product discovery events for products associated with the first and second product identifiers.

5. The method of claim 1 further comprising:
based on a planogram of the store, building a map of the items in the product list, and displaying the map with an indication of location of the items on the map.

6. The method of claim 5 further comprising:
tracking location of the user in the store by sensing audio received by the user's mobile device, and displaying location of the user in a display of the map on a display screen of the user's mobile device.

7. The method of claim 5 further comprising:
tracking location of the user in the store by sensing light signals received by the user's mobile device, and displaying location of the user in a display of the map on a display screen of the user's mobile device.

8. A non-transitory, computer readable medium on which is stored software instructions that, when executed in a processor within a mobile device, configure the mobile device to:
capture a first image of an object;
capture a second image of a display screen;
capture audio obtained from a microphone of the mobile device;
extract a first identifier from first auxiliary data modulated into the object and transferred to the mobile device in the first image;
extract a second identifier from second auxiliary data modulated into a displayed image on the display screen and transferred to the mobile device in the second image;
extract a third identifier from the audio;
retrieve product information associated with the first, second and third identifiers;
generate a product list from the product information;
detect entry of the mobile device in a store;
initiate a shopping session for items on the product list in the store;
based on a comparison of an identifier extracted from an image captured in the store and an identifier of a first product on the product list, display an indicator that a product depicted in the image captured in the store corresponds to the first product;
display an augmented reality display in which the indicator is superimposed on a displayed image of the first product captured by the shopper in the store, the medium further comprising instructions to configure the mobile device to superimpose the indicator at a location in an image frame where the identifier is extracted from a digital watermark; and
maintain a tally of selected items based on sensing a selection of the items in the store.

9. The computer readable medium of claim 8 comprising software instructions that, when executed in the processor within the mobile device, configure the mobile device to:
capture a screen image of a display screen via a camera;
extract a first product identifier from the screen image;
log a product discovery event for a product associated with the first product identifier; and
add the first product identifier to the product list.

10. The computer readable medium of claim 8 comprising software instructions that, when executed in the processor within the mobile device, configure the mobile device to:
capture audio with a microphone of the mobile device;
extract a first product identifier from the audio;
log a product discovery event for a product associated with the first product identifier; and
add the first product identifier to the product list.

11. The computer readable medium of claim 8 comprising software instructions that, when executed in the processor within the mobile device, configure the mobile device to:
capture a screen image of a display screen with a camera of the mobile device;
extract a first product identifier from the screen image;
capture audio with a microphone;
extract a second product identifier from the audio;
log first and second product discovery events for products associated with the first and second product identifiers; and
add the first and second product identifiers to the product list.

12. The computer readable medium of claim 8 comprising software instructions that, when executed in the processor within the mobile device, configure the mobile device to:
building a map depicting location of the items in the product list in the store based on a planogram of the store, and
display the map.

13. The computer readable medium of claim 12 comprising software instructions that, when executed in the processor within the mobile device, configure the mobile device to:
track location of the user in the store by sensing audio received by the user's mobile device, and
display location of the mobile device in a display of the map on a display screen of the mobile device.

14. The computer readable medium of claim 12 comprising software instructions that, when executed in the processor within the mobile device, configure the mobile device to:

track location of the mobile device in the store by sensing light signals received by the mobile device, and display location of the mobile device in a display of the map on a display screen of the mobile device.

15. A non-transitory, computer readable medium on which is stored software instructions that, when executed in a processor within a mobile device, configure the mobile device to:

capture images of objects;

extract identifiers from auxiliary data modulated into the objects and transferred to the mobile device in the images;

retrieve product information associated with the identifiers;

generate a product list from the product information;

detect entry of the mobile device in a store;

initiate a shopping session for items on the product list in the store;

based on a comparison of an identifier extracted from an image captured in the store and an identifier of a first product on the product list, display an indicator that a product depicted in the image captured in the store corresponds to the first product;

display an augmented reality display in which the indicator is superimposed on a displayed image of the first product captured by the shopper in the store, the medium further comprising instructions to configure the mobile device to superimpose the indicator at a location in an image frame where the identifier is extracted from a digital watermark; and maintain a tally of selected items based on sensing a selection of the items in the store.

\* \* \* \* \*